(12) United States Patent
Highgate et al.

(10) Patent No.: US 11,702,496 B2
(45) Date of Patent: Jul. 18, 2023

(54) HYDROPHILIC COMPOSITIONS

(71) Applicant: SUPERDIELECTRICS LTD, Royston (GB)

(72) Inventors: Donald James Highgate, Royston (GB); Ian Hamerton, Royston (GB); Brendan Howlin, Royston (GB)

(73) Assignee: SUPERDIELECTRICS LTD, Royston (GB)

( * ) Notice: Subject to any disclaimer, the term of this patent is extended or adjusted under 35 U.S.C. 154(b) by 108 days.

(21) Appl. No.: 17/448,129

(22) Filed: Sep. 20, 2021

(65) Prior Publication Data

US 2022/0002462 A1 Jan. 6, 2022

Related U.S. Application Data

(63) Continuation of application No. 16/081,624, filed as application No. PCT/GB2016/053753 on Nov. 30, 2016, now Pat. No. 11,168,167.

(30) Foreign Application Priority Data

Mar. 11, 2016 (GB) ..................................... 1604249

(51) Int. Cl.
*C08F 226/10* (2006.01)
*H01M 4/62* (2006.01)
(Continued)

(52) U.S. Cl.
CPC ............ *C08F 226/10* (2013.01); *B33Y 70/00* (2014.12); *C08F 2/48* (2013.01); *C08F 220/18* (2013.01);
(Continued)

(58) Field of Classification Search
CPC .... C08F 220/10; C08F 220/18; C08F 220/28; C08F 220/44; C08F 220/281;
(Continued)

(56) References Cited

U.S. PATENT DOCUMENTS

2001/0025943 A1 10/2001 Michot et al.
2003/0032709 A1* 2/2003 Toshima .............. H10N 10/856
524/439
(Continued)

FOREIGN PATENT DOCUMENTS

CN 1934212 3/2007
CN 101488398 7/2009
(Continued)

OTHER PUBLICATIONS

Badre et al., Highly Conductive Poly(3,4-ethylenedioxythiophene): Poly (styrenesulfonate) Films Using 1-Ethyl-3-methylimidazolium Tetracyanoborate Ionic Liquid, Advanced Functional Materials, 2012, 22, pp. 2723-2727, 5 pages.
(Continued)

*Primary Examiner* — Michael M. Bernshteyn
(74) *Attorney, Agent, or Firm* — Saliwanchik, Lloyd & Eisenschenk

(57) ABSTRACT

A process of forming a cross-linked electronically active hydrophilic co-polymer is provided and includes the steps of: a. mixing an intrinsically electronically active material and at least one compound of formula (I) with water to form an intermediate mixture; b. adding at least one hydrophilic monomer, at least one hydrophobic monomer, and at least one cross-linker to the intermediate mixture to form a
(Continued)

co-monomer mixture; and c. polymerising the co-monomer mixture. Formula (I) is defined as:

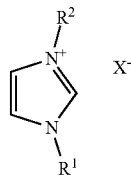

where $R^1$ and $R^2$ are independently optionally substituted $C_1$-$C_6$ alkyl and $X^-$ is an anion.

23 Claims, 26 Drawing Sheets

(51) Int. Cl.
| | |
|---|---|
| B33Y 70/00 | (2020.01) |
| C08F 226/06 | (2006.01) |
| H01G 4/008 | (2006.01) |
| H01G 11/56 | (2013.01) |
| C08F 220/18 | (2006.01) |
| C08F 220/28 | (2006.01) |
| C08F 2/48 | (2006.01) |
| C08F 220/44 | (2006.01) |
| C08G 61/12 | (2006.01) |
| C08K 5/07 | (2006.01) |
| C08K 5/11 | (2006.01) |
| C08K 5/19 | (2006.01) |
| C08K 5/23 | (2006.01) |
| C08L 25/08 | (2006.01) |
| H01G 4/01 | (2006.01) |
| H01G 11/58 | (2013.01) |
| H01M 10/06 | (2006.01) |

(52) U.S. Cl.
CPC .......... *C08F 220/28* (2013.01); *C08F 220/44* (2013.01); *C08F 226/06* (2013.01); *C08G 61/126* (2013.01); *C08K 5/07* (2013.01); *C08K 5/11* (2013.01); *C08K 5/19* (2013.01); *C08K 5/23* (2013.01); *C08L 25/08* (2013.01); *H01G 4/0085* (2013.01); *H01G 4/01* (2013.01); *H01G 11/56* (2013.01); *H01G 11/58* (2013.01); *H01M 4/622* (2013.01); *C08F 220/281* (2020.02); *C08K 2201/001* (2013.01); *H01M 10/06* (2013.01)

(58) Field of Classification Search
CPC .......... C08F 226/06; C08F 2/48; H01G 4/00; H01G 4/01; H01G 11/56; H01G 11/58; C08K 5/07; C08K 5/11; C08K 5/19; C08K 5/23; H01M 4/62; H01M 10/06; B33Y 70/00; C08L 26/08; C08G 1/126
USPC .......................................................... 526/87
See application file for complete search history.

(56) References Cited

U.S. PATENT DOCUMENTS

| | | | | |
|---|---|---|---|---|
| 2006/0226396 A1* | 10/2006 | Majumdar | .......... | C08K 5/0091 |
| | | | | 252/500 |
| 2014/0147668 A1* | 5/2014 | Yamagata | ................ | C09J 7/385 |
| | | | | 524/265 |
| 2014/0150859 A1* | 6/2014 | Zakhidov | ............... | H10K 30/83 |
| | | | | 257/40 |
| 2016/0152872 A1 | 6/2016 | Furuta et al. | | |

FOREIGN PATENT DOCUMENTS

| | | | | | |
|---|---|---|---|---|---|
| CN | 101715626 | | 5/2010 | | |
| CN | 103827246 | | 5/2014 | | |
| CN | 104952634 | | 9/2015 | | |
| EP | 2574460 | | 4/2013 | | |
| GB | 2380055 | | 3/2003 | | |
| GB | 2479449 | | 10/2011 | | |
| GB | 2479449 A | * | 10/2011 | ............. | A61L 27/26 |
| JP | 2005-179551 | | 7/2002 | | |
| JP | 2008-146913 | | 6/2008 | | |
| JP | 2010-161870 | | 7/2010 | | |
| JP | 2010161870 A | * | 7/2010 | | |
| JP | 2011-108425 | | 6/2011 | | |
| JP | 2011-126974 | | 6/2011 | | |
| JP | 2011108425 A | * | 6/2011 | | |
| JP | 2011171674 | | 9/2011 | | |
| WO | 2006104701 | | 10/2006 | | |
| WO | 2014192886 | | 12/2014 | | |

OTHER PUBLICATIONS

Dormer et al., "Concise International Chemical Assessment Document 4, Methyl Methacrylate, First draft prepared by Ms", Dec. 31, 1998 (Dec. 31, 1998), XP055400001, 44 pages.
International Search Report and Written Opinion, PCT International Application No. PCT/GB2016/053753, PCT/ISA/210; PCT/ISA/237, dated Feb. 3, 2017.
Fauze A. Aouada et al., PAAm and PEDOT/PSS hydrogel as potential electroactive devices: evaluation of surface and hydrophilic properites, e-Polymers Dec. 1, 2008, vol. 8, No. 1.
Markus Dobbelin et al., Influence of Ionic Liquids on the Electrical Conductivity and Morphology of PEDOT:PSS Films, Chem Mater. 2007, vol. 19, No. 9, 2147-2149.
Yu Zhao et al., 3D nanostructured conductive polymer hydrogels for high-performance electrochemical devices, Energy & Environmental Science, Aug. 12, 2013, vol. 6, No. 10, 2856-2870.
Vivian Feig, Electrochemical and Adhesion Properties of PEDOT:PSS as a Coating for Gold Electrodes for Applications in Metal-Molecule-Metal Junctions, Dec. 31, 2010, BIO NNIN REU Reseach Accomplishments, pp. 14-15, URL:https://www.nnin.org/sites/default/files/files/2010nninreura/2010NNINreuFeigV.
Japanese Office Action, Notice of Reasons for Refusal, Japanese Patent Application No. 547347/0218, dated Sep. 8, 2020.
Arvin Sreeram et al., Simultaneous electronic and ionic conduction in ionic liquid imbibed polyacetylene-like conjugated polymer films, RSC Advances, Royal Society of Chemistry, 2015, 5, 88425-88435.

* cited by examiner

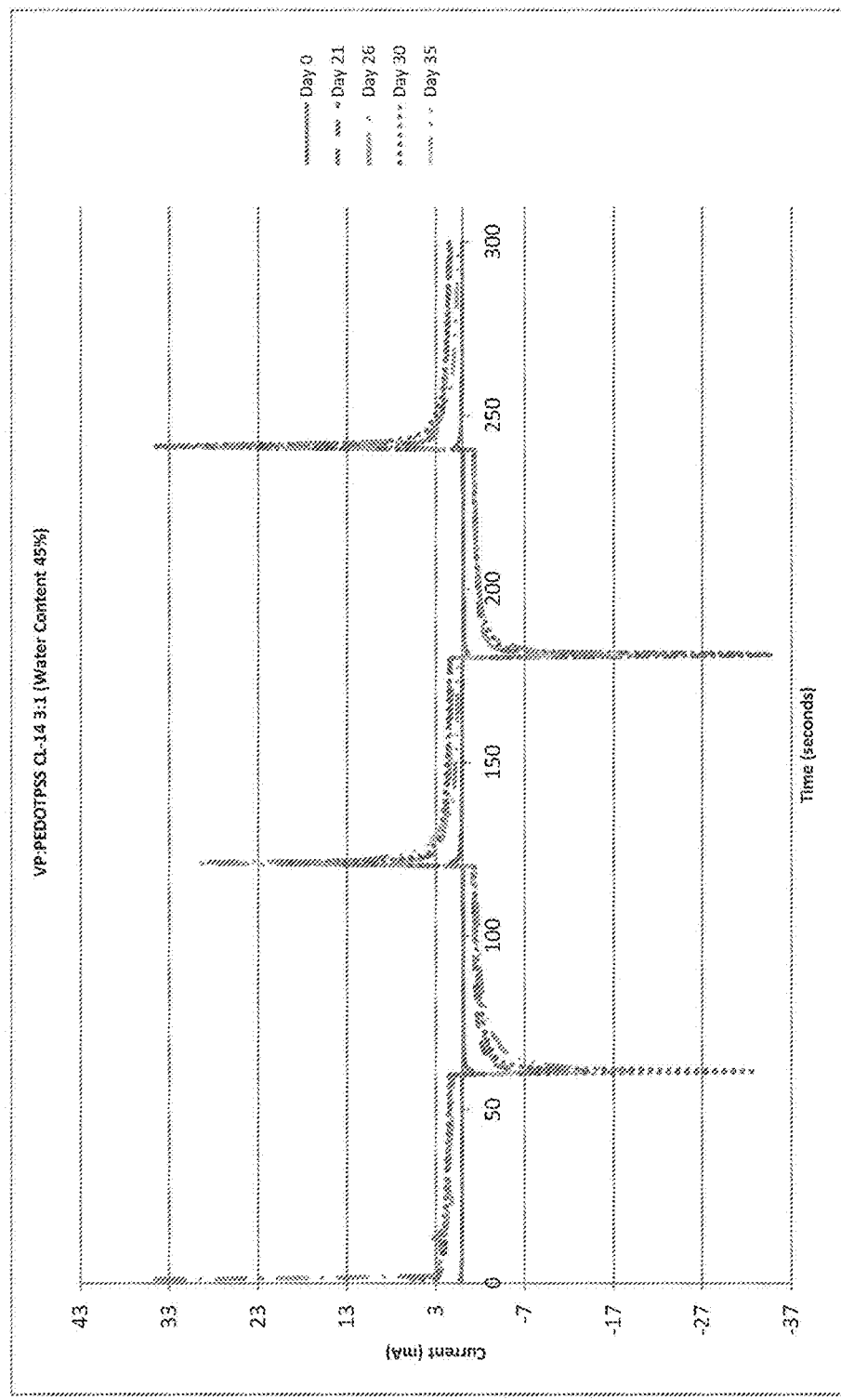
Figure 1: VP·PEDOT-PSS + CL-14 (45% water content)

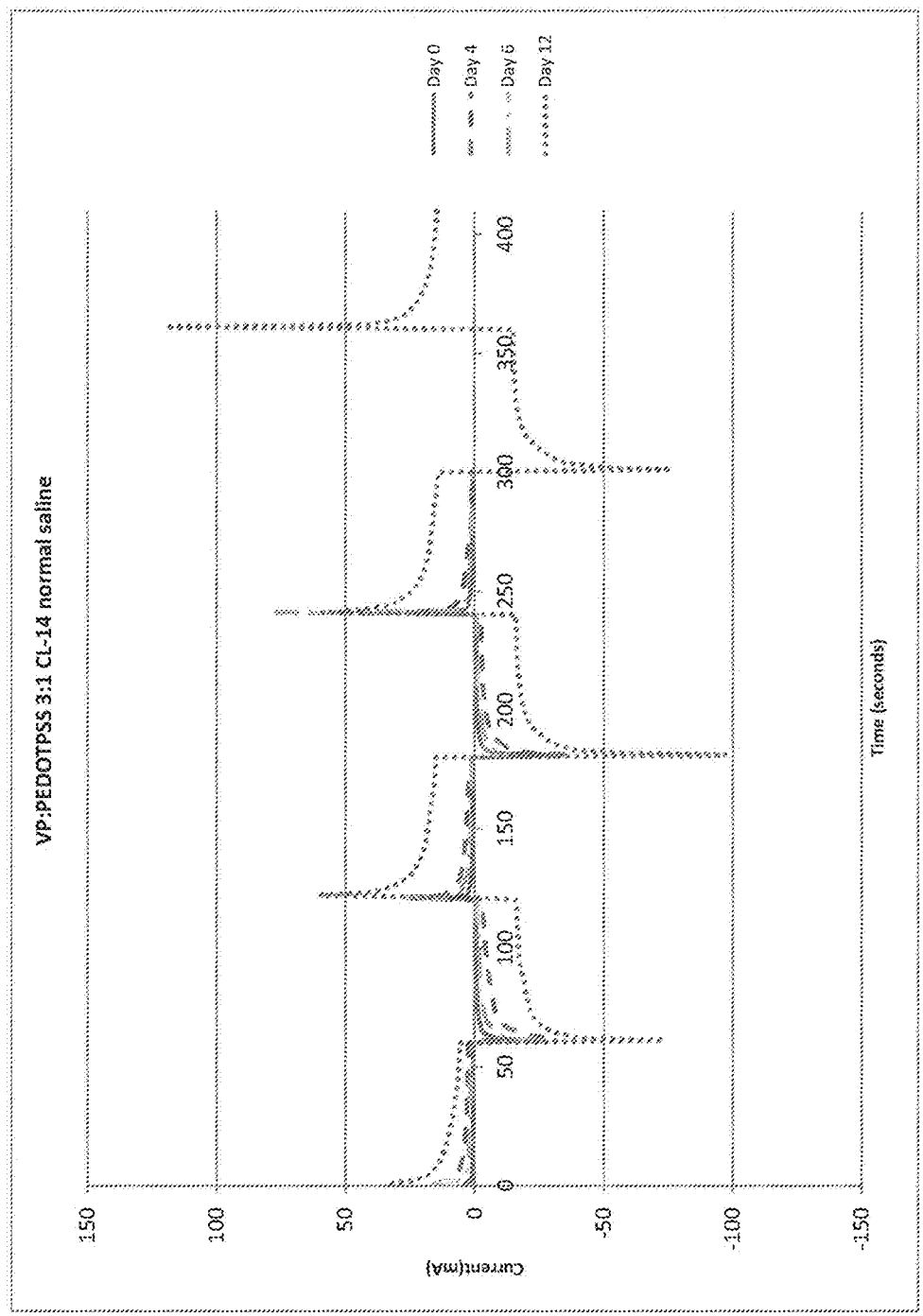
Figure 2: VP:PEDOT-PSS + CL-14 (maximum hydration in saline)

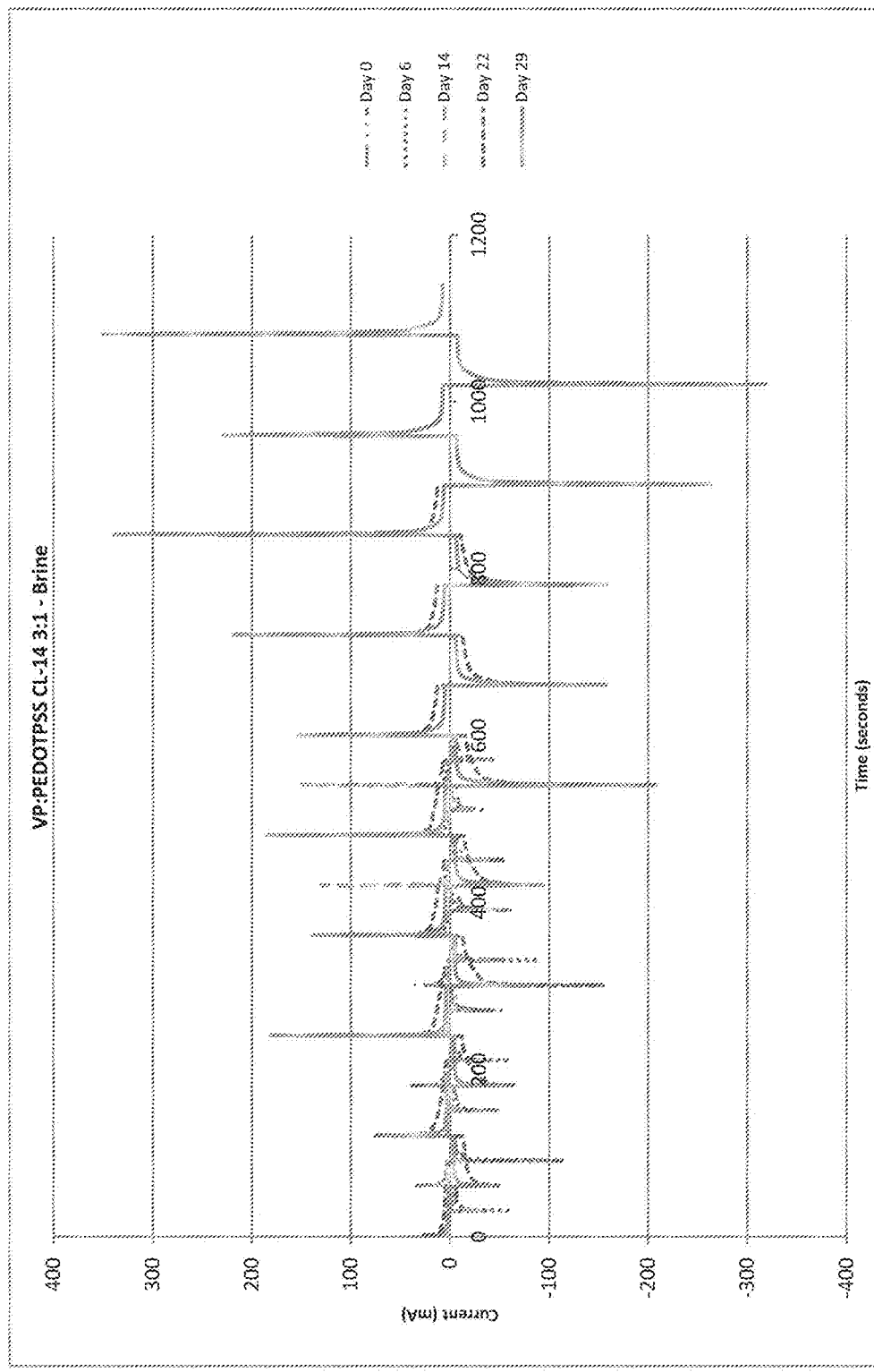
Figure 3 :VP:PEDOT-PSS + CL-14 (maximum hydration in brine)

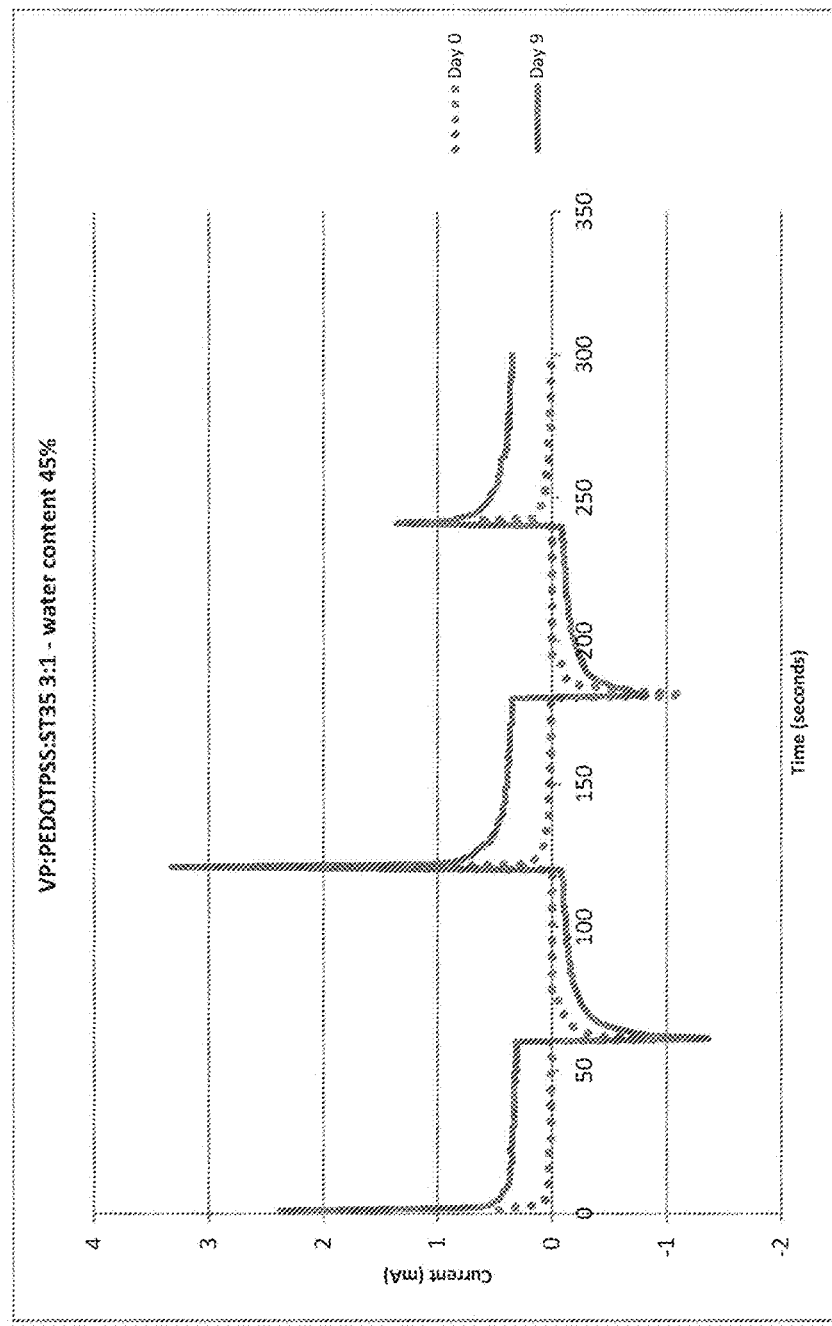
Figure 4   VP:PEDOT-PSS + ST-35 (45% water content)

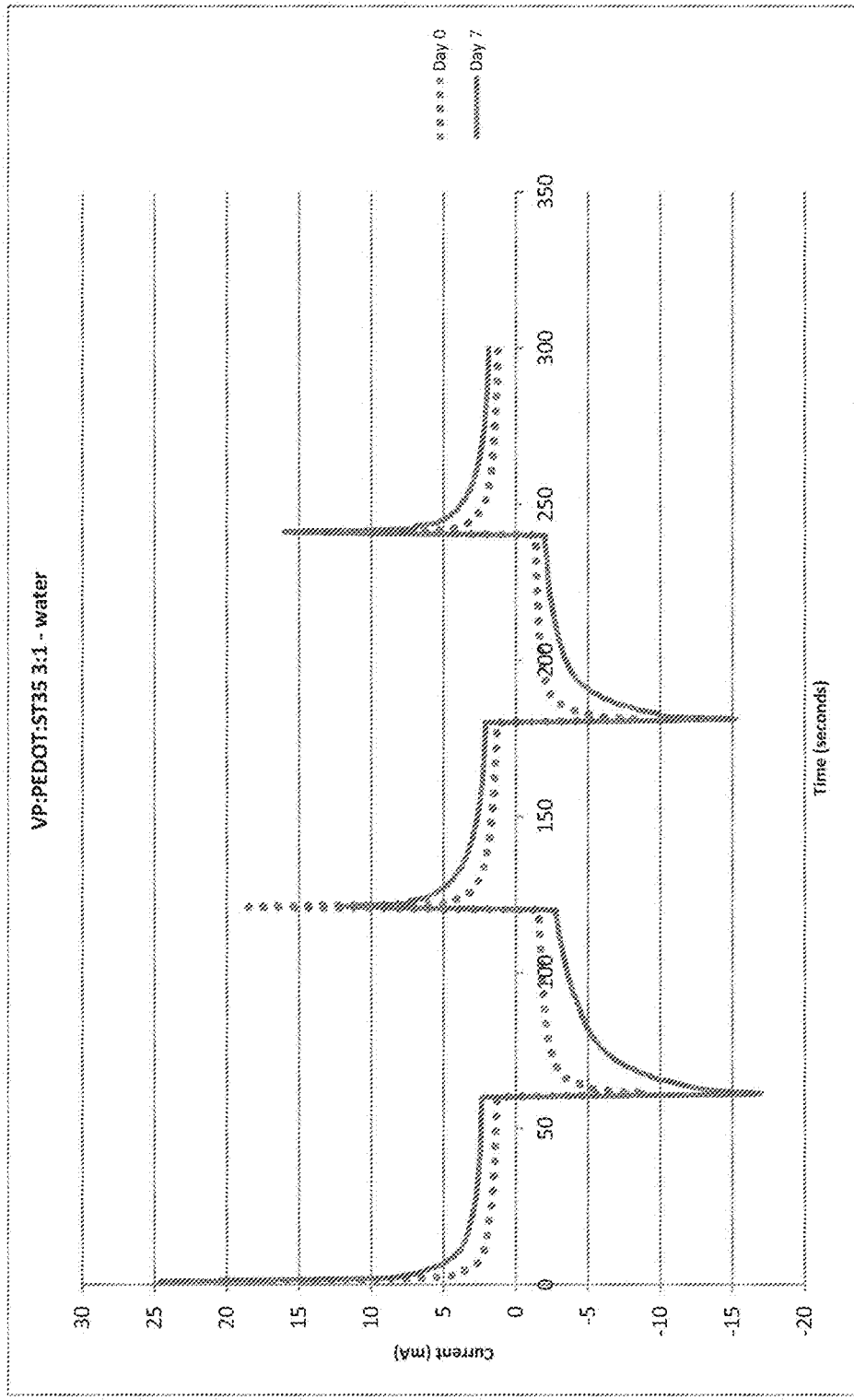
Figure 5: VP:PEDOT-PSS + ST-35 (maximum hydration in DD water)

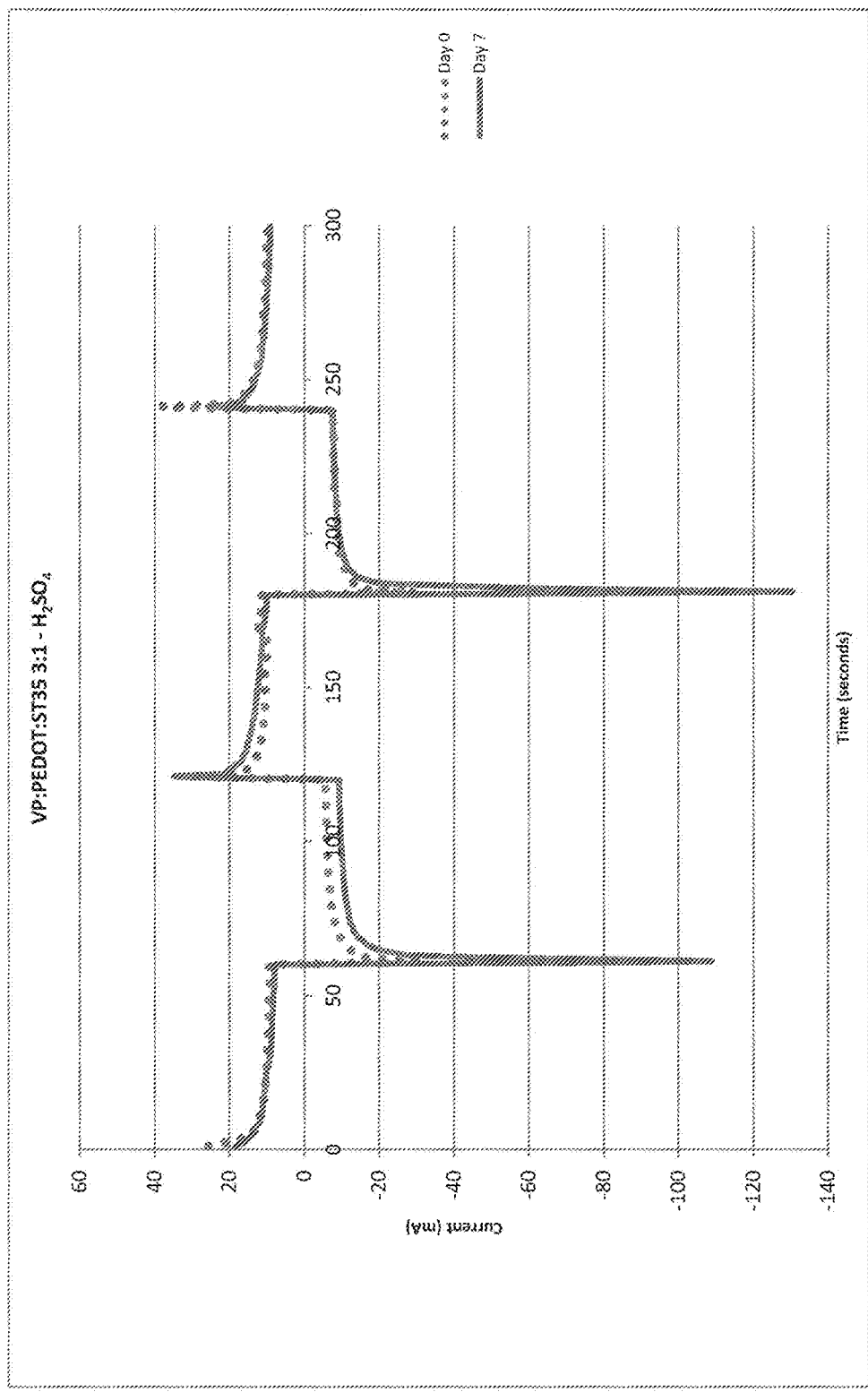
Figure 6: VP:PEDOT-PSS + ST-35 (maximum hydration in H₂SO₄)

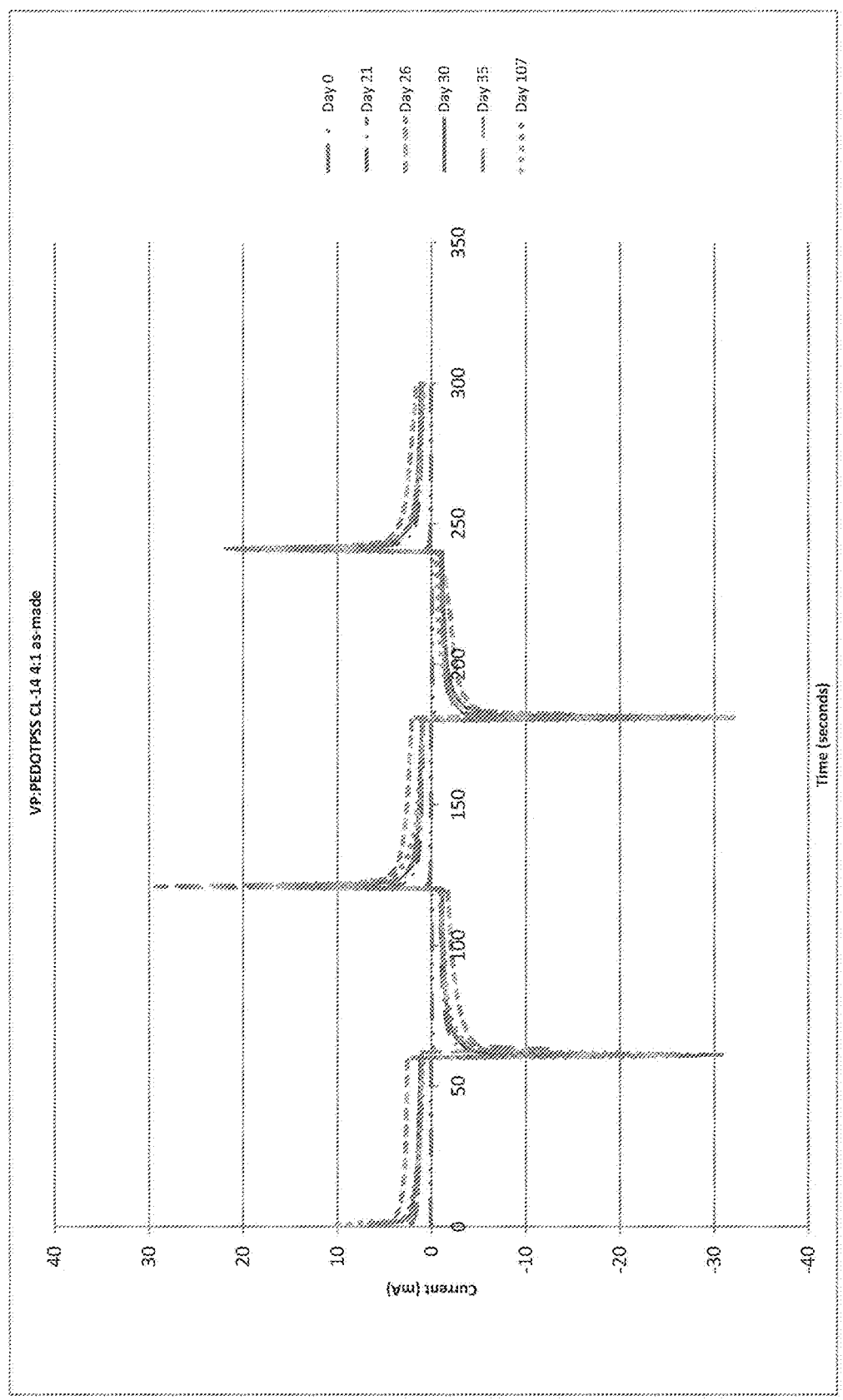
Figure 7: VP:PEDOT-PSS (4:1 ratio) with CL-14

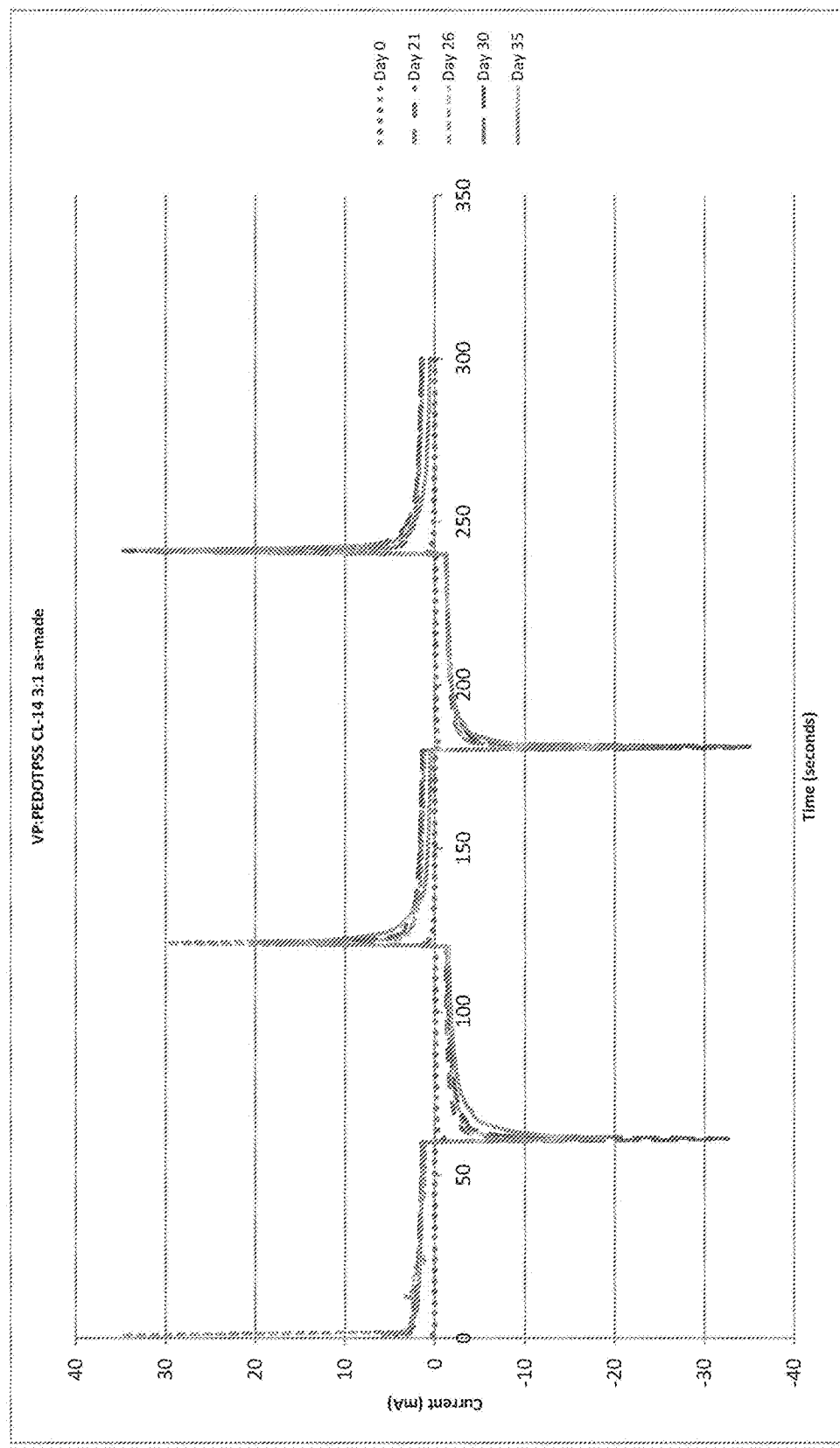
Figure 8. VP:PEDOT-PSS (3:1 ratio) with CL-14

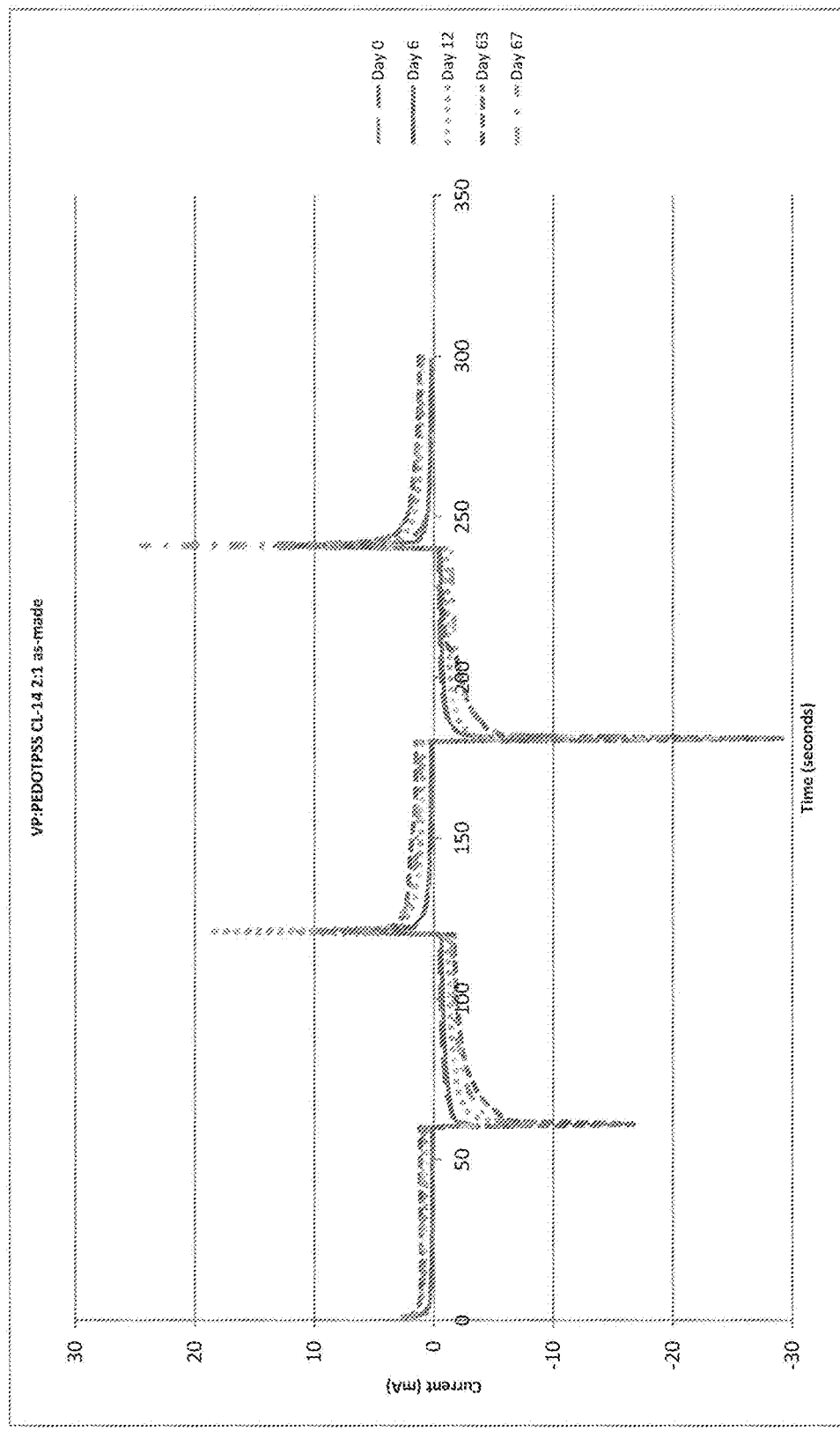
Figure 9. VP:PEDOT-PSS (2:1 ratio) with CL-14

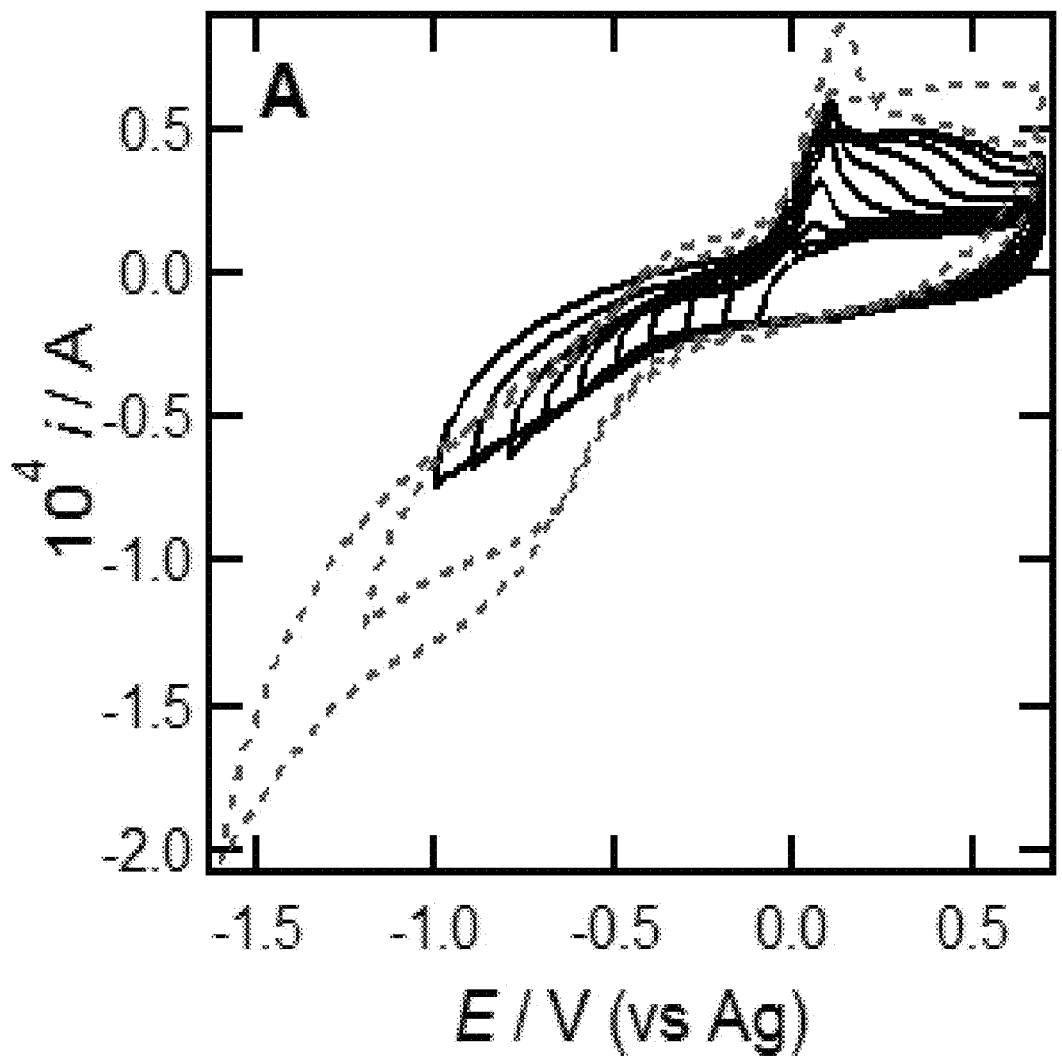
Figure 10: Cyclic voltammogram of VP:PEDOTPSS:Cl4 at 100 mV s-1 as a function of the negative potential limits. Dashed lines indicate non-symmetrical current responses linked to irreversible structural changes (e.g. decomposition) in the co-polymer layer.

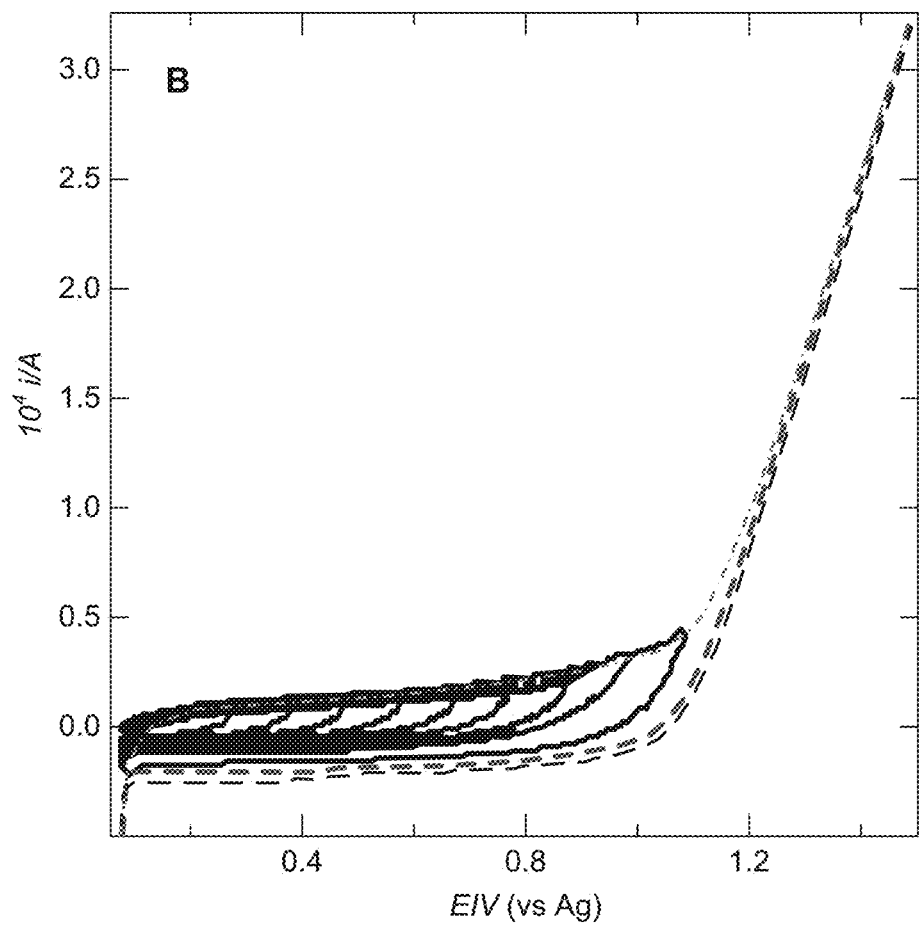
Figure 11: Cyclic voltammogram of VP:PEDOTPSS:Cl4 at 100 mV s-1 as a function of the negative potential limits. Dashed lines indicate non-symmetrical current responses linked to irreversible structural changes (e.g. decomposition) in the co-polymer layer.

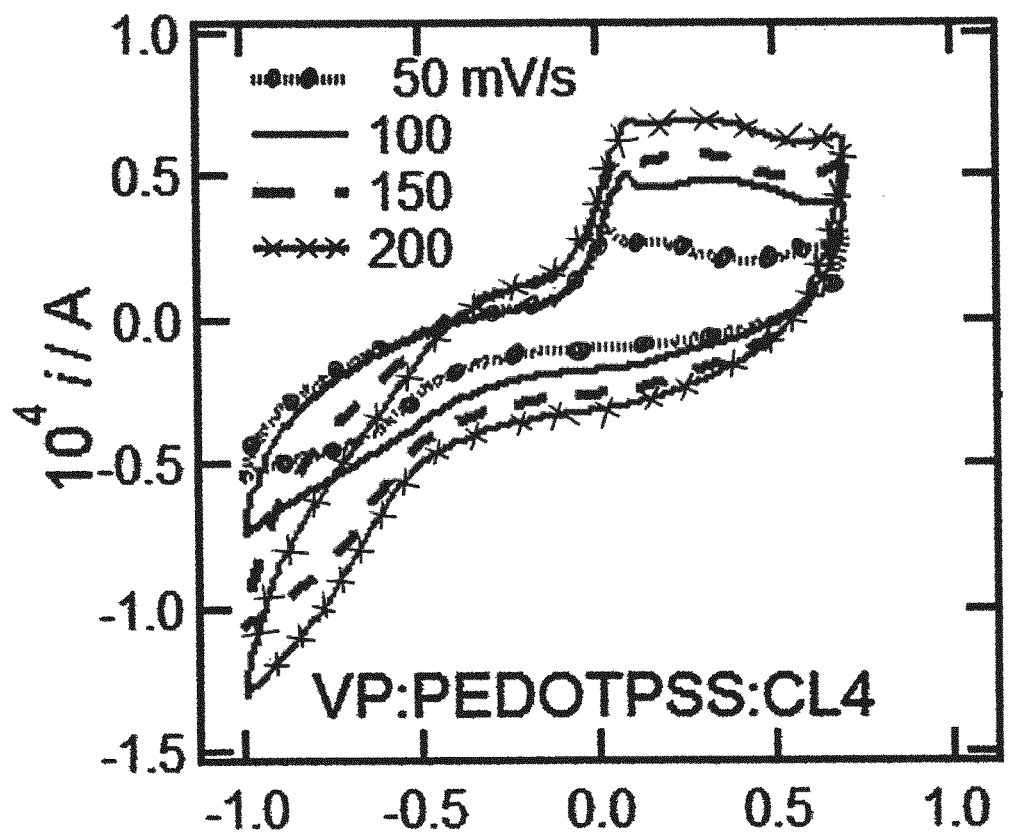
Figure 12: Cyclic voltammogram of VP:PEDOTPSS:Cl4 (as made) at scan rates of 50, 100, 150, and 200 mV s-1

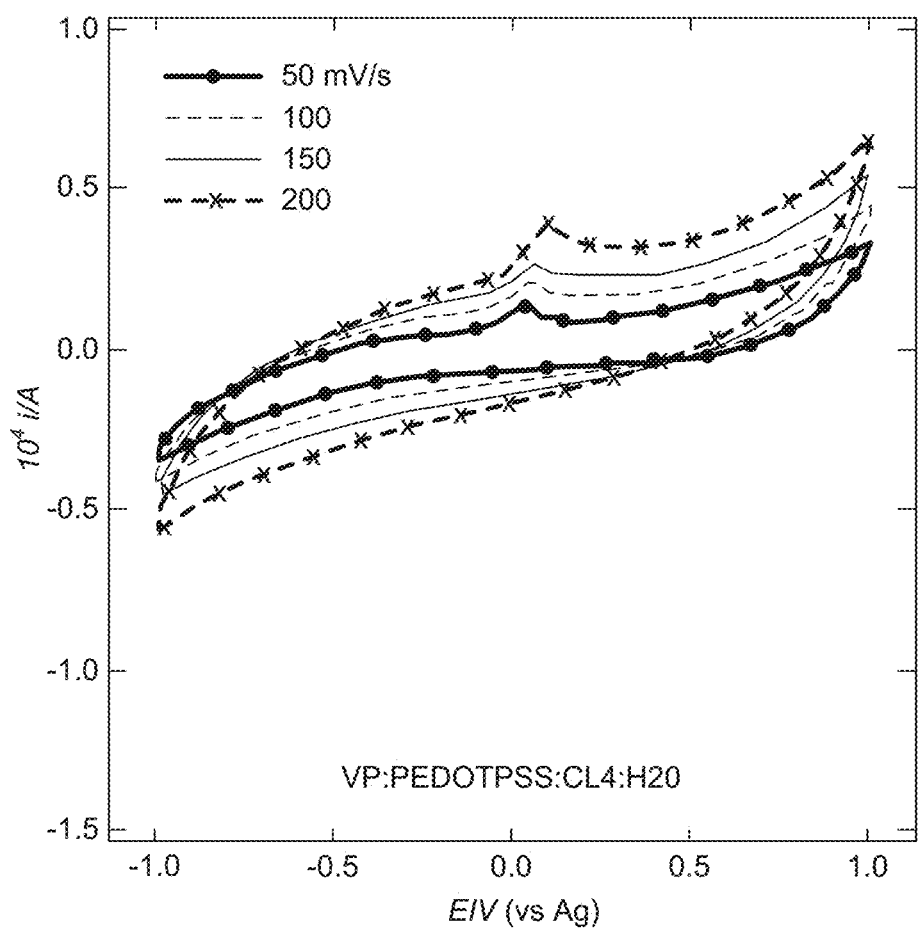
Figure 13: Cyclic voltammogram of VP:PEDOTPSS:Cl4 (hydrated in water) at scan rates of 50, 100, 150, and 200 mV s-1

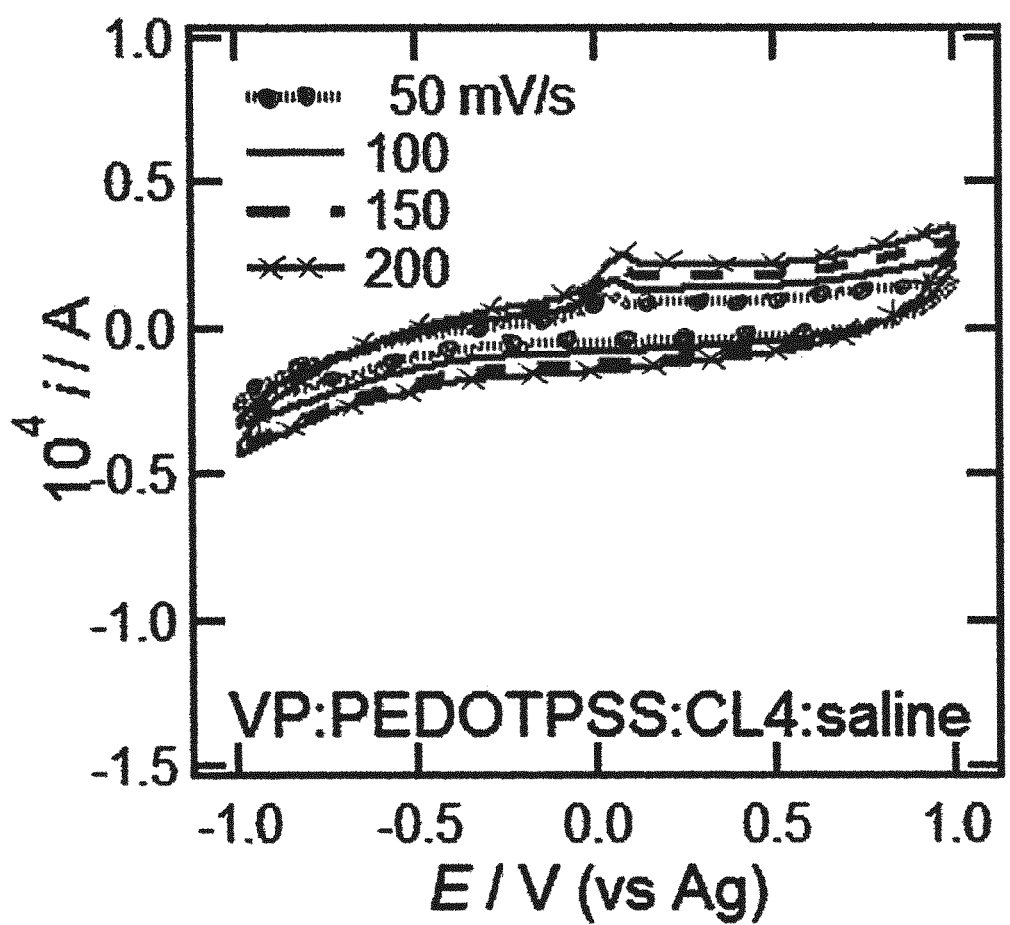
Figure 14: Cyclic voltammogram of VP:PEDOTPSS:Cl4 (hydrated in saline) at scan rates of 50, 100, 150, and 200 mV s-1

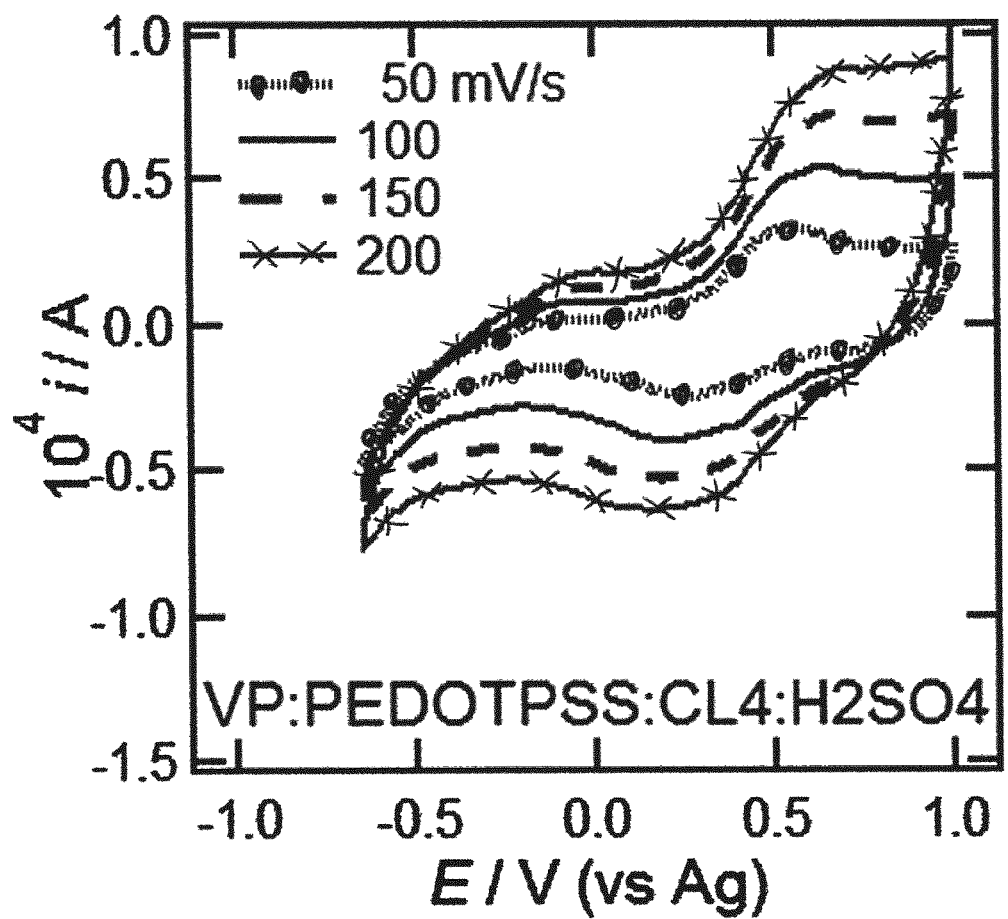
Figure 15: Cyclic voltammogram of VP:PEDOTPSS:Cl4 (hydrated in $H_2SO_4$) at scan rates of 50, 100, 150, and 200 mV s-1

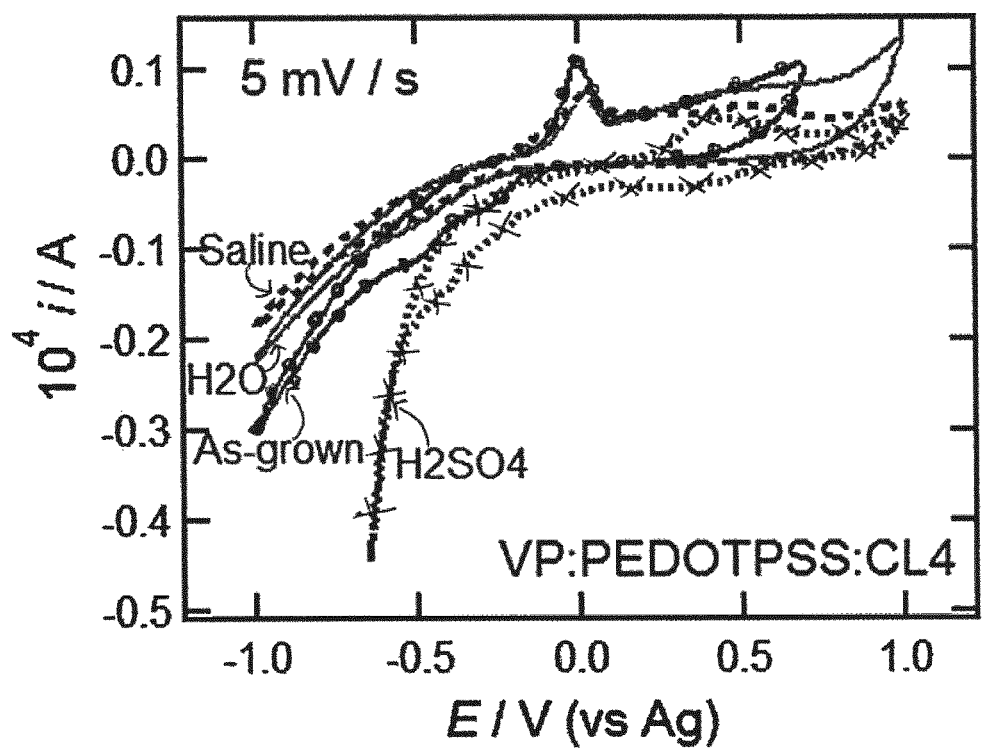
Figure 16 Cyclic voltammogram of as made VP:PEDOTPSS:Cl4, saline hydrated VP:PEDOTPSS:Cl4, water hydrated VP:PEDOTPSS:Cl4, and $H_2SO_4$ hydrated VP:PEDOTPSS:Cl4, at a scan rate of 5 mV s-1

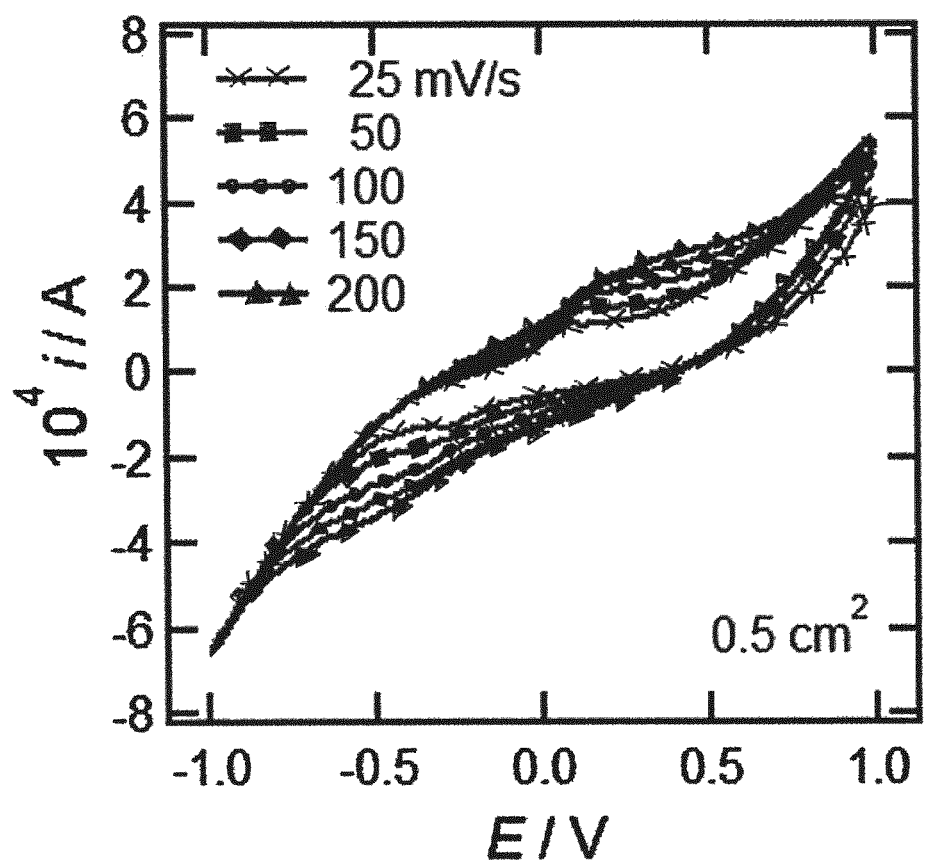
Figure 17: Cyclic voltammogram of VP:PEDOTPSS:Cl4 (as made) at scan rates of 25, 50, 100, 150 and 200 mV s-1

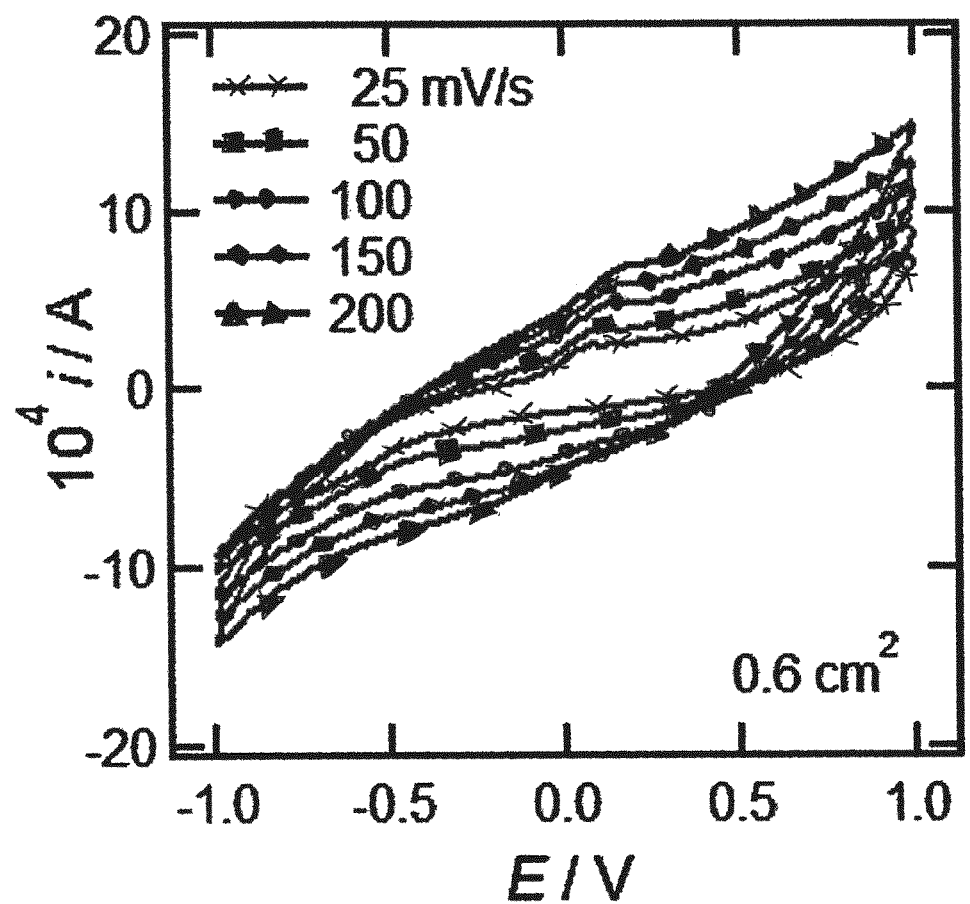
Figure 18: Cyclic voltammogram of VP:PEDOTPSS:Cl4 (as made) at scan rates of 25, 50, 100, 150 and 200 mV s-1

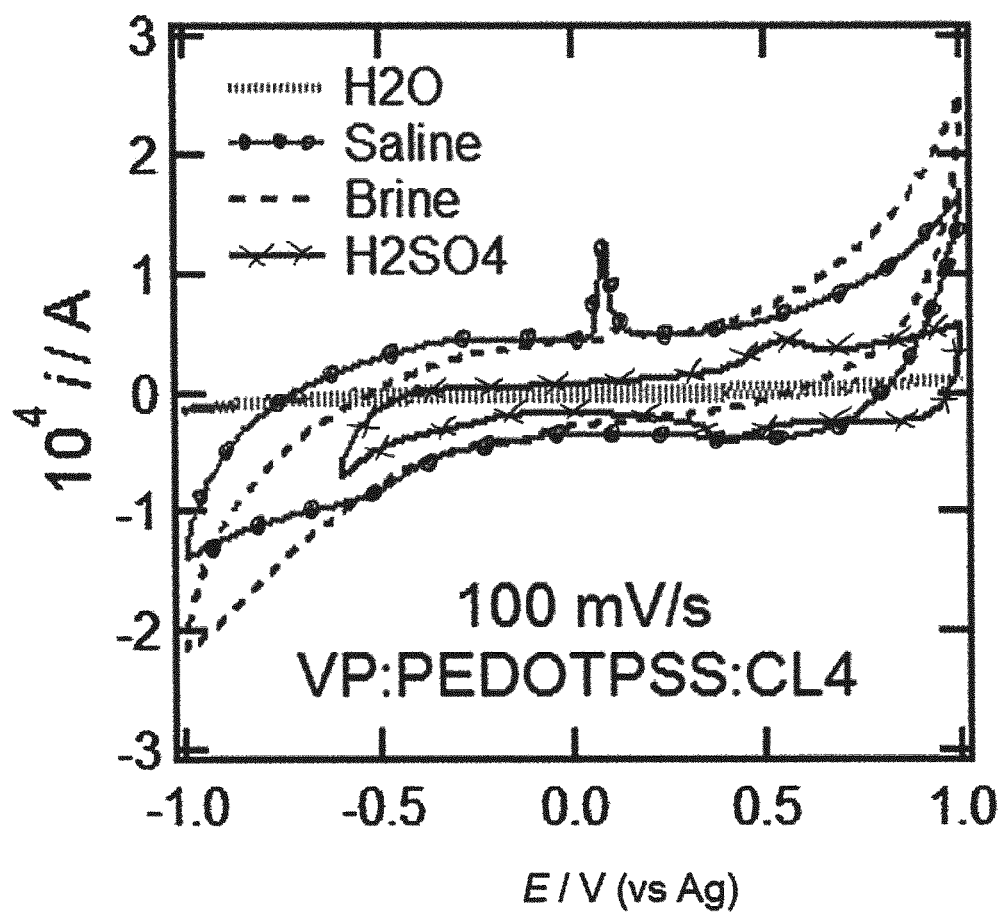
Figure 19: Cyclic voltammogram of saline hydrated VP:PEDOTPSS:Cl4, water hydrated VP:PEDOTPSS:Cl4, $H_2SO_4$ hydrated VP:PEDOTPSS:Cl4, and brine hydrated VP:PEDOTPSS:Cl4, at scan rates of 100 mV s-1

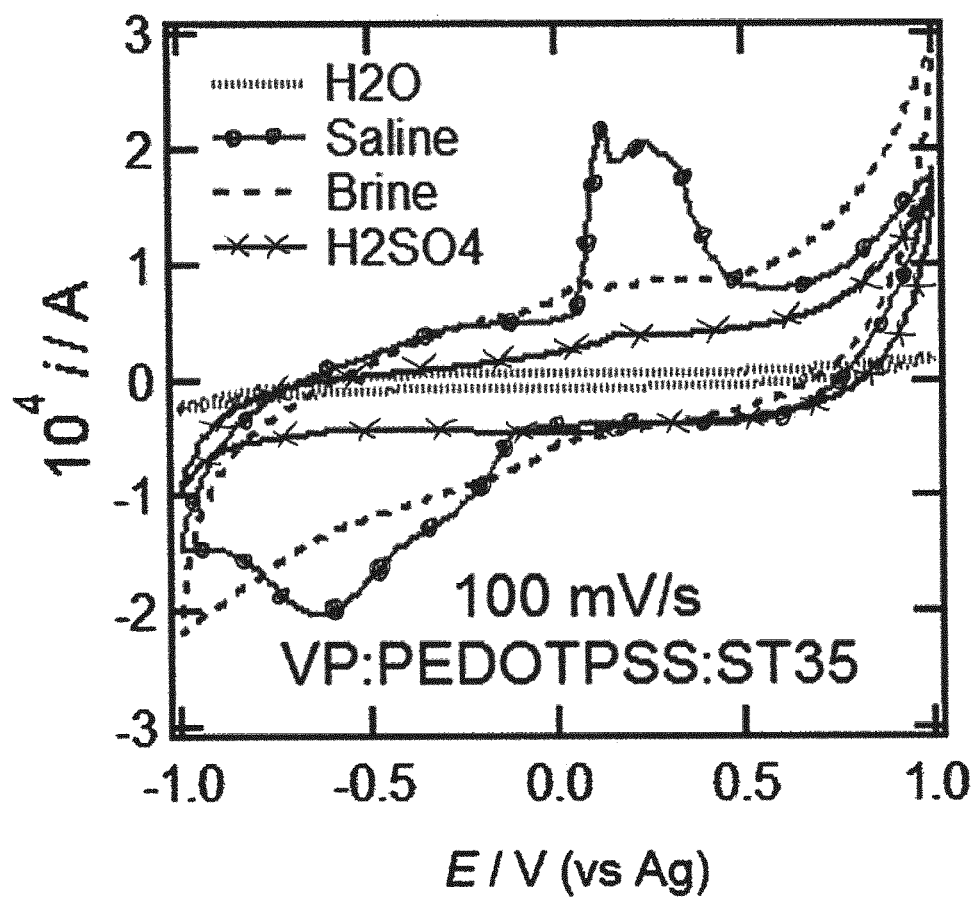
Figure 20: Cyclic voltammogram of saline hydrated VP:PEDOTPSS:ST35, water hydrated VP:PEDOTPSS:ST35, $H_2SO_4$ hydrated VP:PEDOTPSS:ST35, and brine hydrated VP:PEDOTPSS:ST35, at scan rates of 100 mV s-1

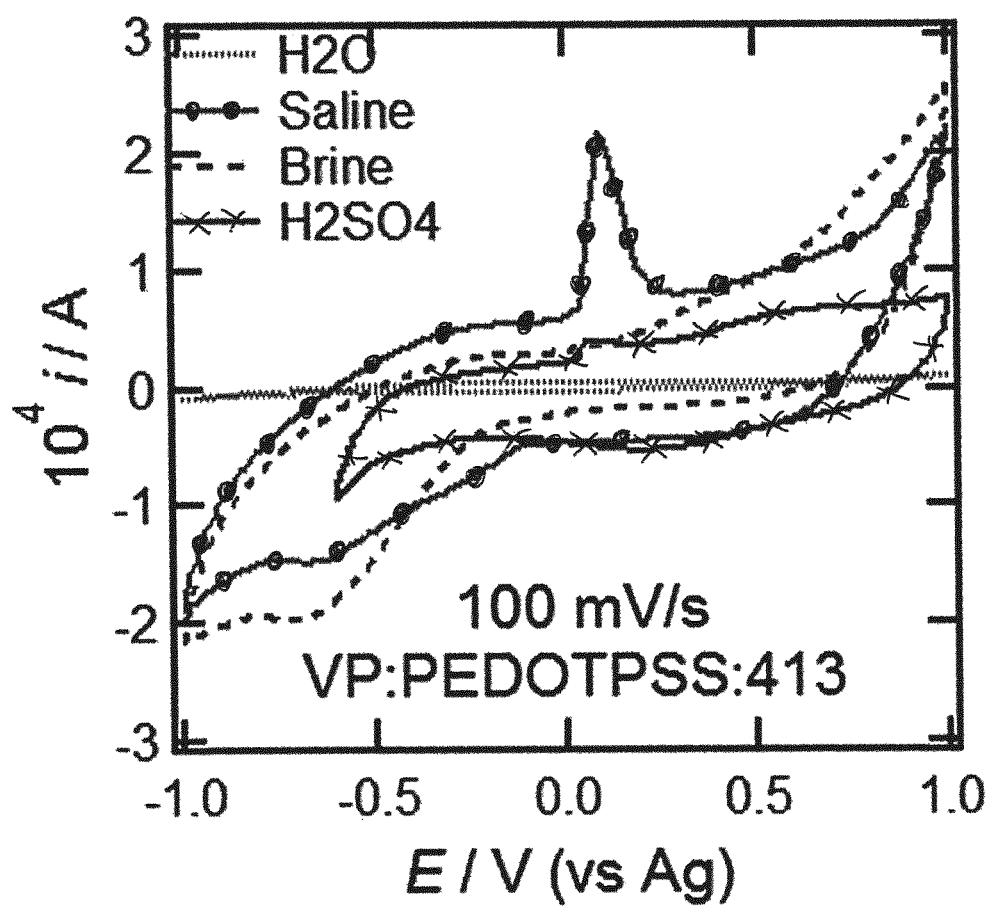
Figure 21: Cyclic voltammogram of saline hydrated VP:PEDOTPSS:413, water hydrated VP:PEDOTPSS:413, $H_2SO_4$ hydrated VP:PEDOTPSS:413, and brine hydrated VP:PEDOTPSS:413, at scan rates of 100 mV s-1

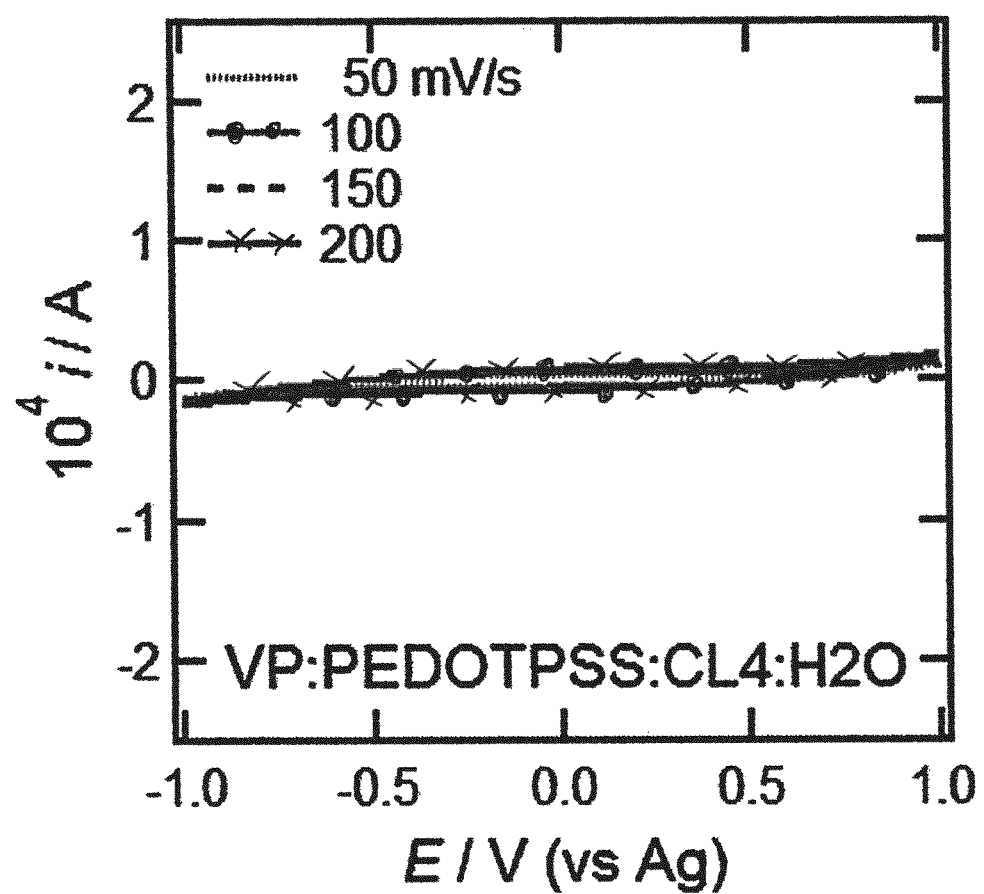
Figure 22: Cyclic voltammograms of VP:PEDOTPSS:Cl4 hydrated in water at scan rates of 50, 100, 150 and 200 mV s-1

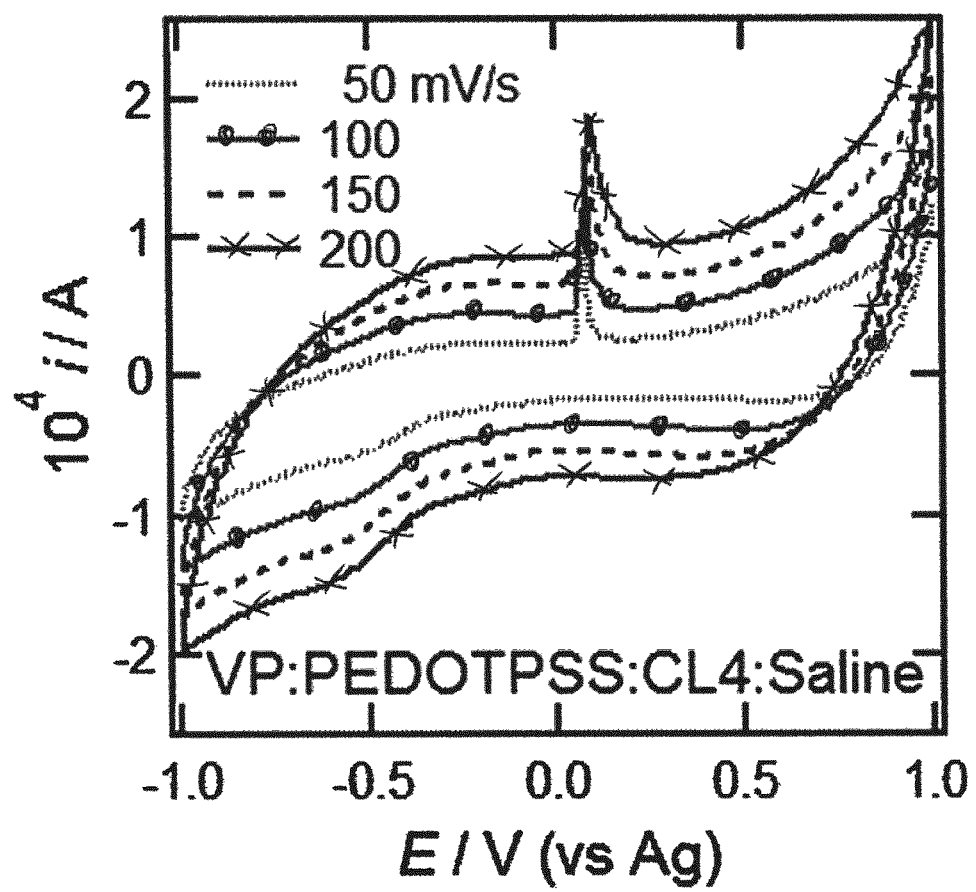
Figure 23: Cyclic voltammograms of VP:PEDOTPSS:Cl4 hydrated in saline at scan rates of 50, 100, 150 and 200 mV s-1

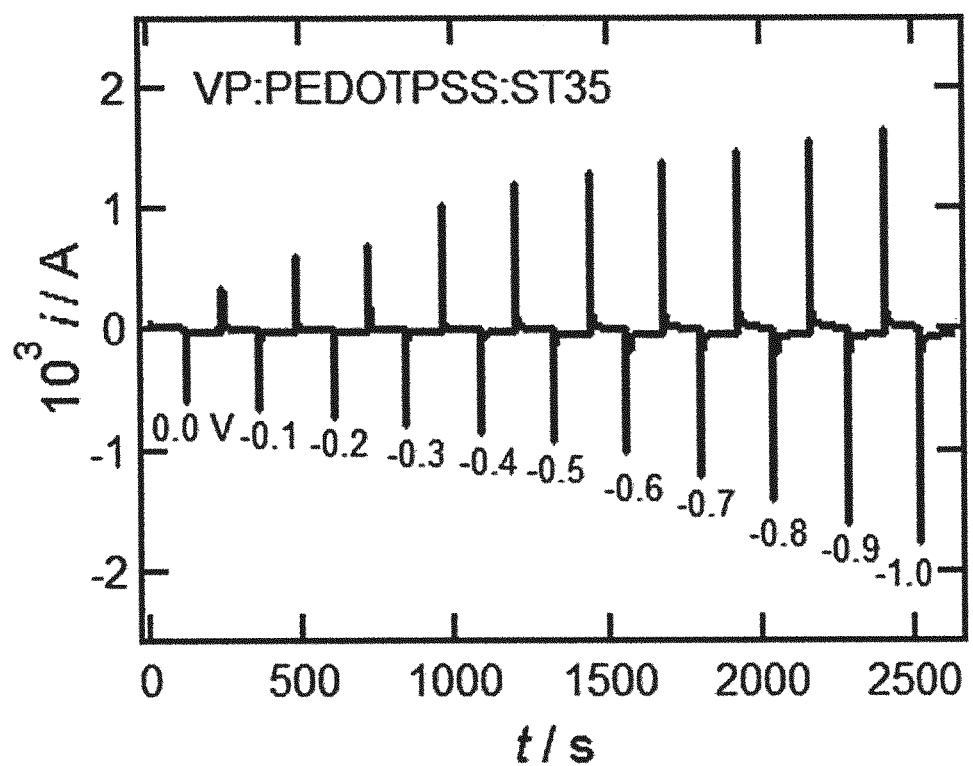
Figure 24: chronoamperometric transient for saline hydrated VP:PEDOTPSS:ST35 from 1V to various negative potentials

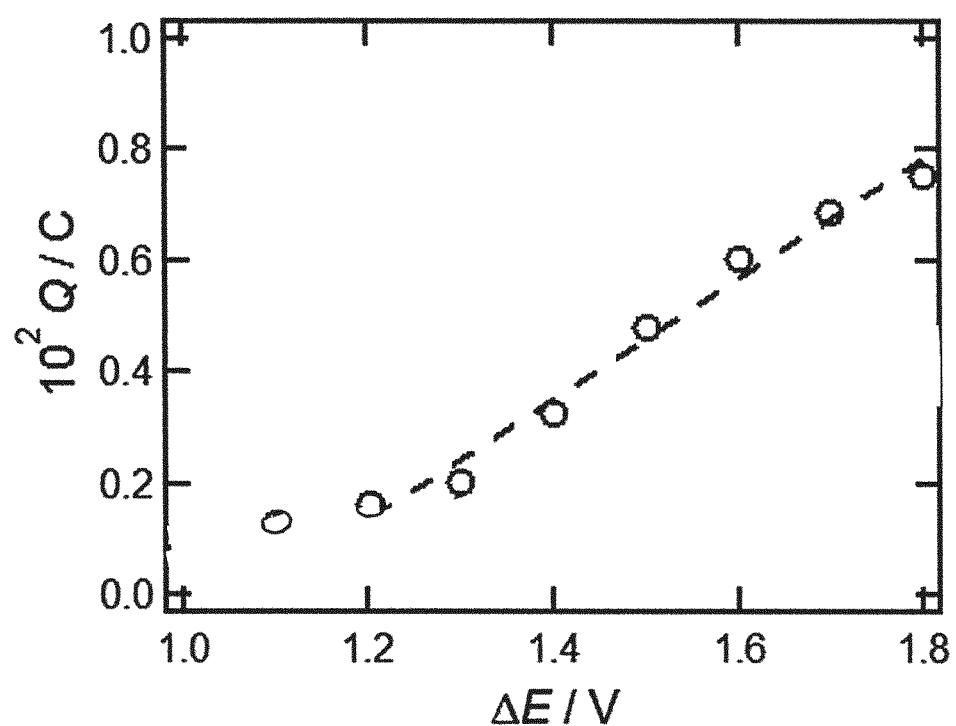
Figure 25: charges obtained by integration of the transients of Figure 24 as a function of amplitude of the potential step for saline hydrated VP:PEDOTPSS:ST35

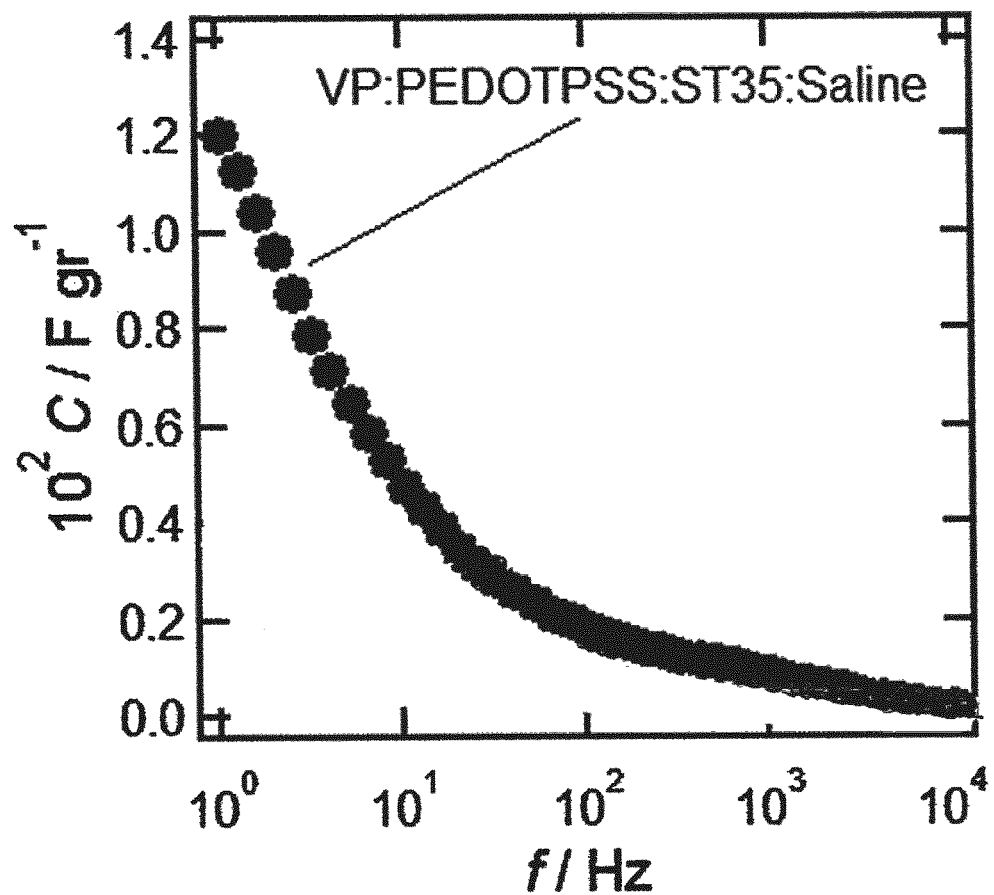
Figure 26: frequency dependence of the phenomenological specific capacitance of VP:PEDOTPSS:ST35 hydrated in saline

HYDROPHILIC COMPOSITIONS

CROSS-REFERENCE TO RELATED APPLICATIONS

This application is a continuation application of Ser. No. 16/081,624, filed Aug. 31, 2018, which is a national stage application of International Patent Application No. PCT/GB2016/053753, filed Nov. 30, 2016, which claims priority to Great Britain Application No. 1604249.1, filed Mar. 11, 2016, the disclosures of each of which are incorporated herein by reference in their entirety, including any figures, tables, and drawings.

FIELD OF THE INVENTION

The present invention relates to improved electronically active hydrophilic polymers and their production.

BACKGROUND OF THE INVENTION

Intrinsically electronically conductive polymers are known, and are understood to mean materials in which the conduction process is principally dependent upon electron transfer. This is in contrast to ionically conductive polymers, where the conduction process is principally dependent on ion transfer.

As a result of their electronic conductivity, electronically conductive polymers may have applicability within electronic systems, such as car batteries, mobile phone screens and computer screens. The functioning of these electronic systems relies on the transmission and proper control of electrons. Electronically conductive polymers include polyacetylene, which has achieved electrical conductivities of $10^7$ S/m approximating to that of common metals, while commercial materials supplied as dispersions in water, e.g. polyethylenedioxythiophene:polystyrene sulphonate (PEDOT:PSS, commercially available as Clevios 500®), have a conductivity of $3 \times 10^4$ S/m and exceed the conductivity of graphite commonly used as a conductor in electrochemical cells.

However, electronically conductive polymers have poor water properties, and this limits their applicability in aqueous environments. These electronically conductive polymers become unstable when dispersed or dissolved in aqueous environments. They are therefore of most use when they are dry, and are of very limited use in electronic systems with a water-based environment e.g. car batteries. Water-based environments in electronic systems may be saline, acid or alkaline aqueous environments.

Further, electronically conductive polymers can be challenging to produce, and are usually produced as a non-self-supporting film. Owing to their non-self-supporting nature, polymerisation or deposition is carried out on a solid support, such as a glass sheet, in order to form these polymers. As such, the resulting polymer is a largely two-dimensional film, rather than a bulk three-dimensional structure.

SUMMARY OF THE INVENTION

It has been found that, when mixed in a particular order, a co-monomer mixture comprising at least one hydrophobic monomer, at least one hydrophilic monomer, water, at least one cross-linker, at least one compound of formula (I), and an intrinsically electronically active material, provides (once polymerised) a new electronically active hydrophilic co-polymer. This material is homogenous and isotropic in its conductive properties, and in its water properties. It is hydrophilic, crosslinked and electronically conductive, throughout its entire structure.

Formula (I) is defined as follows:

wherein:
$R^1$ and $R^2$ are independently optionally substituted $C_1$-$C_6$ alkyl;
$X^-$ is an anion;

As a result of their hydrophilicity, the co-polymers described herein have good water properties resulting in improved performance in aqueous environments of electronic systems (existing hydrophilic materials are ionically conductive, rather than electronically conductive). The co-polymers are stable in a wide-variety of different water-based environments, and perform well not only in distilled deionized (DD) water, but also in aqueous environments such as saline, brine, acid or alkali solution. Furthermore, the co-polymers described herein also have excellent mechanical properties and electrical conductivity. It is thought that the use of at least one compound of formula (I) imparts particularly improved electrical properties to the final co-polymer. As such, the co-polymer materials disclosed herein have wide applicability within electronic systems, including those with water-based environments, such as car batteries. This is in contrast to existing electronic materials such as PEDOT:PSS, which is conventionally used only in dry environments, owing to its poor water properties.

Further, the specific order of mixing used to obtain the co-monomer mixture allows a bulk three-dimensional co-polymer structure to be achieved (rather than a largely two-dimensional polymer film). The resulting co-polymer is self-supporting, and as such does not need to be polymerized onto a substrate.

In a first aspect the present invention provides a process of forming a cross-linked electronically active hydrophilic co-polymer comprising the steps of:
a. mixing an intrinsically electronically active material and at least one compound of formula (I) with water to form an intermediate mixture;
b. adding at least one hydrophilic monomer, at least one hydrophobic monomer, and at least one cross-linker to the intermediate mixture to form a co-monomer mixture;
c. polymerising the co-monomer mixture;
wherein formula (I) is defined as:

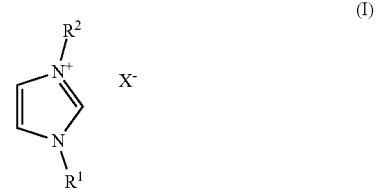

wherein:

$R^1$ and $R^2$ are independently optionally substituted $C_1$-$C_6$ alkyl;

$X^-$ is an anion.

In a second aspect, the present invention provides a homogenous, isotropic electronically active hydrophilic co-polymer obtainable by the process according to the first aspect of the invention.

In a third aspect, the present invention provides a co-monomer mixture comprising at least one hydrophobic monomer, at least one hydrophilic monomer, water, at least one cross-linker, an intrinsically electronically active material, and at least one compound of formula (I), formula (I) being defined as:

(I)

wherein:

$R^1$ and $R^2$ are independently optionally substituted $C_1$-$C_6$ alkyl;

$X^-$ is an anion.

Further aspects are defined in the independent claims and include a variety of industrial products that make use of electronic systems. One such industrial product is a supercapacitor. As a result of their improved electronic properties, the co-polymers described herein may be used as the electrolyte component within a supercapacitor system. When the co-polymers described herein are used in this context, the resulting supercapacitor achieves particularly high capacitance values. Furthermore, as a result of the improved mechanical properties and self-supporting nature of the co-polymers described herein, the resulting supercapacitor does not require an additional separator.

BRIEF DESCRIPTION OF DRAWINGS

FIG. 1 shows a plot of current (in milliamps (mA)) versus time (in seconds (s)) for VP:PEDOT-PSS and CL-14 (45% water content) FIG. 2 shows a plot of current (in mA) versus time (in s) for VP:PEDOT-PSS and CL-14 (maximum hydration in saline).

FIG. 3 shows a plot of current (in mA) versus time (in s) for VP:PEDOT-PSS and CL-14 (maximum hydration in brine).

FIG. 4 shows a plot of current (in mA) versus time (in s) for VP:PEDOT-PSS and ST-35 (45% water content).

FIG. 5 shows a plot of current (in mA) versus time (in s) for VP:PEDOT-PSS and ST-35 (maximum hydration in DD water).

FIG. 6 shows a plot of current (in mA) versus time (in s) for VP:PEDOT-PSS and ST-35 (maximum hydration in $H_2SO_4$).

FIG. 7 shows a plot of current (in mA) versus time (in s) for VP:PEDOT-PSS (4:1 ratio) with CL-14.

FIG. 8 shows a plot of current (in mA) versus time (in s) for VP:PEDOT-PSS (3:1 ratio) with CL-14.

FIG. 9 shows a plot of current (in mA) versus time (in s) for VP:PEDOT-PSS (2:1 ratio) with CL-14.

FIG. 10 shows a cyclic voltammogram of VP:PEDOTPSS:CI4 at 100 millivolts per second (mV/s) as a function of the negative potential limits. Dashed lines indicate non-symmetrical current responses linked to irreversible structural changes (e.g., decomposition) in the co-polymer layer.

FIG. 11 shows a cyclic voltammogram of VP:PEDOTPSS:CI4 at 100 mV/s as a function of the negative potential limits. Dashed lines indicate non-symmetrical current responses linked to irreversible structural changes (e.g., decomposition) in the co-polymer layer.

FIG. 12 shows a cyclic voltammogram of VP:PEDOTPSS:CI4 (as made) at scan rates of 50, 100, 150, and 200 mV/s.

FIG. 13 shows a cyclic voltammogram of VP:PEDOTPSS:CI4 (hydrated in water) at scan rates of 50, 100, 150, and 200 mV.

FIG. 14 shows a cyclic voltammogram of VP:PEDOTPSS:CI4 (hydrated in saline) at scan rates of 50, 100, 150, and 200 mV.

FIG. 15 shows a cyclic voltammogram of VP:PEDOTPSS:CI4 (hydrated in $H_2SO_4$) at scan rates of 50, 100, 150, and 200 mV.

FIG. 16 shows a cyclic voltammogram of as-made VP:PEDOTPSS:CI4, saline-hydrated VP:PEDOTPSS:CI4, water-hydrated VP:PEDOTPSS:CI4, and $H_2SO_4$-hydrated VP:PEDOTPSS:CI4 at a scan rate of 5 mV.

FIG. 17 shows a cyclic voltammogram of VP:PEDOTPSS:CI4 (as made) at scan rates of 25, 50, 100, 150, and 200 mV/s.

FIG. 18 shows a cyclic voltammogram of VP:PEDOTPSS:CI4 (as made) at scan rates of 25, 50, 100, 150, and 200 mV/s.

FIG. 19 shows a cyclic voltammogram of saline-hydrated VP:PEDOTPSS:CI4, water-hydrated VP:PEDOTPSS:CI4, $H_2SO_4$-hydrated VP:PEDOTPSS:CI4, and brine-hydrated VP:PEDOTPSS:CI4 at a scan rate of 100 mV.

FIG. 20 shows a cyclic voltammogram of saline-hydrated VP:PEDOTPSS:CI4, water-hydrated VP:PEDOTPSS:CI4, $H_2SO_4$-hydrated VP:PEDOTPSS:CI4, and brine-hydrated VP:PEDOTPSS:CI4 at a scan rate of 100 mV.

FIG. 21 shows a cyclic voltammogram of saline-hydrated VP:PEDOTPSS:CI4, water-hydrated VP:PEDOTPSS:CI4, $H_2SO_4$-hydrated VP:PEDOTPSS:CI4, and brine-hydrated VP:PEDOTPSS:CI4 at a scan rate of 100 mV.

FIG. 22 shows a cyclic voltammogram of VP:PEDOTPSS:CI4 (hydrated in water) at scan rates of 50, 100, 150, and 200 mV/s.

FIG. 23 shows a cyclic voltammogram of VP:PEDOTPSS:CI4 (hydrated in saline) at scan rates of 50, 100, 150, and 200 mV/s.

FIG. 24 shows a chronoamperometric transient for saline-hydrated VP:PEDOTPSS:ST35 from 1 Volt (V) to various negative potentials.

FIG. 25 shows a plot of charges obtained by integration of the transients of FIG. 24 as a function of amplitude of the potential step for saline-hydrated VP:PEDOTPSS:ST35.

FIG. 26 shows a plot of frequency dependence of the phenomenological specific capacitance of VP:PEDOTPSS:ST35 hydrated in saline.

DESCRIPTION OF THE PREFERRED EMBODIMENTS

As used herein, the term "monomer" takes its usual definition in the art, and so refers to a molecular compound that may chemically bind to another monomer to form a polymer.

As used herein, the term "co-monomer mixture", takes its usual definition in the art, and so refers to a solution or dispersion of miscible monomers that, when polymerised, forms a co-polymer.

As used herein, the term "cross-linker" refers to molecular compound capable of forming chemical bonds between polymer chains, and includes compounds such as methylenebisacrylamide, N-(1-Hydroxy-2,2-dimethoxyethyl)acrylamide, allyl methacrylate and ethylene glycol dimethacrylate. Allyl methacrylate and ethylene glycol dimethacrylate are preferred. The cross-linker may be hydrophobic or hydrophilic.

As used herein, the term "polymerisation initiator" takes its usual definition in the art, and so refers to an agent capable of initiating the process of chemical polymerisation, for example free-radical polymerisation. Azobisisobutyronitrile (AIBN) and-hydroxy-2-methylpriophenone are examples of such initiators. Azobisisobutyronitrile (AIBN) has utility when polymerisation is by thermal means, and 2-hydroxy-2-methylpriophenone is suitable for use with UV polymerisation.

As used herein, the term "intermediate mixture" refers to a solution or dispersion to which further components are added. For instance, in the context of forming the co-monomer mixture, the term "intermediate mixture" refers to a mixture including some, but not all the components of the complete co-monomer mixture.

As used herein, the term "co-polymer" takes its usual definition in the art, and so refers to a polymer whose polymer chains comprise two or more different types of monomers.

As used herein, the term "water properties" when used in relation to a polymer material, refers the properties and behaviour of that polymer material in relation to water and other aqueous environments, such as saline solution i.e. its hydrophilicity and stability in an aqueous environment.

As used herein, the term "homogenous", when used in relation to a polymer material, refers to a polymer material whose physical properties (e.g. conductive properties and water properties) are substantially uniform throughout its entire structure.

As used herein, the term "isotropic", when used in relation to a polymer material, refers to a polymer material whose properties are the same in all orientations.

As used herein, the term "homogenous" when used in relation to a co-monomer mixture, refers to a co-monomer solution or dispersion comprising miscible monomers that are uniformly dissolved or mixed.

As used herein, the term "hydrophilic polymer" refers to a polymer that dissolves in water when it is not cross-linked and absorbs water and swells to form a stable elastic solid when cross-linked.

As used herein, the term "hydrophilic monomer" takes its usual definition in the art, and so refers to a monomer with an affinity for water molecules. The term "hydrophobic monomer" also takes its usual definition in the art, and so refers to a monomer that repels water molecules.

As used herein, the term "electrically active" takes its usual definition in the art, and so can encompass both electronically active and ionically active materials.

As used herein, the term "electronically active material" takes its usual definition in the art, and refers to a material in which the conduction process is principally dependent upon electron transfer, or in which an electron is yielded as an output at an interface.

As used herein, the term "intrinsically electronically active material" refers to a material that is electronically active without requiring further modification to be rendered electronically active.

As used herein, the term "ionically active material" takes its usual definition in the art, and refers to a material in which the conduction process is principally dependent on ion transfer.

As used herein, the term "water" as a component in the intermediate or co-monomer mixture refers to added water, i.e. water added to the remaining components not including any water already associated with the raw materials of the remaining components, e.g. when such raw materials are supplied as an aqueous solution or dispersion.

As used herein, $C_1$-$C_6$ alkyl refers to a straight or branched alkyl group having from 1 to 6 carbon atoms. Examples include methyl, ethyl, n-propyl, isopropyl, n-butyl, isobutyl, sec-butyl and tert-butyl, n-pentyl, tert-pentyl, neopentyl, isopentyl, sec-pentyl, 3-pentyl, n-hexyl, tert-hexyl, isohexyl and sec-hexyl.

Unless otherwise specified in the context in which it occurs, the term "substituted" as applied to any moiety herein means substituted with at least one substituent, for example selected from ($C_1$-$C_6$)alkyl, ($C_1$-$C_6$)alkoxy, hydroxy, hydroxy($C_1$-$C_6$)alkyl, mercapto, mercapto($C_1$-$C_6$) alkyl, ($C_1$-$C_6$)alkylthio, halo (including fluoro and chloro), trifluoromethyl, trifluoromethoxy, nitro, nitrile (—CN), oxo, phenyl, —COOH, —COOR$^A$, —COR$^A$, —S$_2$R$^A$, —CONH$_2$, —SO$_2$NH$_2$, —CONHR$^A$, —SO$_2$NHR$^A$, —CONR$^A$R$^B$, —SO$_2$NR$^A$R$^B$, —NH$_2$, —NHR$^A$, —NR$^A$R$^B$, —OCONH$_2$, —OCONHR$^A$, —OCONR$^A$R$^B$, —NHCOR$^A$, —NH$^B$COOR$^A$, —NR$^B$COOR$^A$, —NHSO$_2$OR$^A$, —NR$^B$SO$_2$OR$^A$, —NHCONH$_2$, —NR$^A$CONH$_2$, —NHCONHR$^B$, —NR$^A$CONHR$^B$, —NHCONR$^A$R$^B$ or —NR$^A$CONR$^A$R$^B$ wherein R$^A$ and R$^B$ are independently a ($C_1$C$_6$)alkyl group, or R$^A$ and R$^B$ when attached to the same nitrogen may form a cyclic amino ring such as a morpholinyl, piperidinyl or piperazinyl ring. An "optional substituent" or "substituent" may be one of the foregoing substituent groups.

As used herein, the term "liquid electrolyte" takes its usual definition in the art, and so refers to a solution of cations (such as potassium, sodium, calcium and magnesium) and anions (such as chloride, carbonate and phosphate) dissolved in a solvent, such as water, acetonitrile, propylene carbonate or tetrahydrofuran. As used herein, the term "aqueous electrolyte" takes its usual definition in the art, and so refers to an aqueous solution containing cations (such as potassium, sodium, calcium and magnesium) and anions (such as chloride, carbonate and phosphate).

As used herein, the term "optoelectronic display device" takes its usual definition in the art, and so refers to a device capable of sourcing, detecting and controlling electromagnetic energy, such as infra-red ultraviolet, or visible light.

In a first aspect the present invention provides a process of forming a cross-linked electronically active hydrophilic co-polymer comprising the steps of:

a. mixing an intrinsically electronically active material and at least one compound of formula (I) with water to form an intermediate mixture;

b. adding at least one hydrophilic monomer, at least one hydrophobic monomer, and at least one cross-linker to the intermediate mixture to form a co-monomer mixture;

c. polymerising the co-monomer mixture;

wherein formula (I) is defined as:

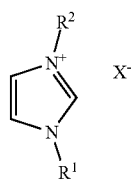

wherein:
$R^1$ and $R^2$ are independently optionally substituted $C_1$-$C_6$ alkyl;
$X^-$ is an anion.

Preferably, the electronically active material is a polymer.

It has been found that when the components are mixed in the specific order according to the first aspect of the present invention, a homogenous co-monomer mixture is obtained. This is in contrast to the other possible orders of mixing, where the components are prone to separate out into distinct layers during the polymerisation process, thereby preventing the formation of a continuous material. As these problems are avoided with the process disclosed herein, a continuous bulk three-dimensional co-polymer structure is achieved, that is of a self-supporting nature.

More preferably, the intrinsically electronically active material is PEDOT:PSS. The problems associated with other orders of mixing aside from that of the process disclosed herein are particularly pronounced for PEDOT:PSS. Yet, when PEDOT:PSS is used as the intrinsically electronically active material in the context of the present invention, good results are achieved, as shown in the examples.

The use of at least one compound of formula (I) results in the final co-polymer having particularly improved electrical properties. The at least one compound of formula (I) is present in an amount of 8% to 33% by weight, preferably, 14% to 20% by weight, most preferably 17% by weight based on the total weight of the co-monomer mixture. The compound of formula (I) is typically added in step a) as an ionic liquid. For the avoidance of doubt, the imidazolium component of the compound of formula (I) also covers imidazolium tautomers due to electronic delocalisation around the imidazolium ring, and so includes the following structures:

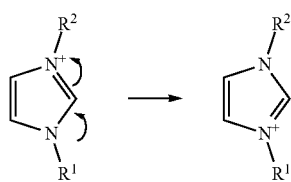

Preferably, $X^-$ is selected from $Cl^-$, $C_2N_3^-$, $CH_3O_3S^-$, $BF_4^-$, $PF_6^-$, $CF_3SO_3^-$, $Al_2Cl_7^-$, $AlCl_4^-NO_3^-$, $OH^-$, $F^-$, $Br^-$, $I^-$, $S_2^-$, $N_3^-$, $O_2^-$, $CO_3^{2-}$, $ClO_3^-$, $CrO_4^{2-}$, $CN^-$, $Cr_2O_7^{2-}$, $SCN^-$, $SO_3^{2-}$, $MnO_4^-$, $CH_3COO^-$, $HCO_3^-$, $ClO_4^-$ and $C_2O_4^{2-}$. More preferably, $X^-$ is selected from $Cl^-$, $C_2N_3^-$, $CH_3O_3S^-$, $BF_4^-$, $PF_6^-$, $CF_3SO_3^-$, $Al_2Cl_7^-$, $AlCl_4^-$ and $NO_3^-$. Most preferably, $X^-$ is selected from $Cl^-$, $C_2N_3^-$ and $CH_3O_3S^-$.

Preferably, the optional substituent is selected from one or more of hydroxyl, halo, $NH_2$, $NO_2$., $CH_3O$, $CO_2H$, COOOH, NR, NRR', NHCOR and RSH, wherein R and R' are $C_1$-$C_6$ alkyl. More preferably, the optional substituent is selected from one or more of hydroxyl, halo, $NH_2$ or $NO_2$. When either or both of $R^1$ and $R^2$ are substituted with particular functional groups, the dispersion properties of resulting compound of formula (I) can be adjusted and improved.

$R^1$ and $R^2$ may be the same or different. Preferably, one of $R^1$ and $R^2$ is optionally substituted methyl, and the other is optionally substituted ethyl.

Most preferably, the at least one compound of formula (I) is selected from 1-ethyl-3-methylimidazolium chloride, 1-ethyl-3-methylimidazolium dicyanamide, and 1-ethyl-3-methylimidazolium methanesulfonate.

Preferably, in step b, the at least one hydrophilic monomer and the at least one hydrophobic monomer are added to the intermediate mixture prior to the addition of the cross-linker.

Preferably, in step b, the at least one hydrophilic monomer is added to the intermediate mixture prior to the addition of the at least one hydrophobic monomer.

Preferably, the at least one hydrophilic monomer is selected from methacrylic acid, hydroxyethyl methacrylate (e.g. 2-hydroxyethyl methacrylate), ethyl acrylate, vinyl pyrrolidone (e.g. n-vinyl-2-pyrrolidone), propenoic acid methyl ester (e.g. propenoic acid 2-methyl ester), monomethacryloyloxyethyl phthalate, poly-vinyl alcohol, ammonium sulphatoethyl methacrylate, or a combination thereof. Preferably, the co-monomer mixture comprises one hydrophilic monomer.

More preferably, the at least one hydrophilic monomer is selected from vinyl-2-pyrrolidone (VP) and 2-hydroxyethyl methacrylate, or a combination thereof. More preferably, the at least one hydrophilic monomer is selected from 1-vinyl-2-pyrrolidone (VP) and 2-hydroxyethyl methacrylate, or a combination thereof.

Preferably, the at least one hydrophobic monomer is selected from methyl methacrylate, acrylonitrile (AN), methacryloxypropyltris(trimethylsiloxy)silane, 2,2,2-trifluoroethyl methacrylate, allyl methacrylate, or a combination thereof. Preferably, the co-monomer mixture comprises one hydrophobic monomer.

More preferably, the at least one hydrophobic monomer is selected from acrylonitrile and methyl methacrylate, or a combination thereof.

Preferably, the at least one cross-linker is selected from allyl methacrylate or ethylene glycol dimethacrylate.

It will be appreciated from the definitions above, that the terms used above are not necessarily mutually exclusive. For example, the terms "hydrophobic monomer" and "cross-linker" are not necessarily mutually exclusive. In the present invention, the hydrophobic monomer and the cross-linker may be the same or different.

The hydrophobic monomer may, in certain embodiments, be the same as the cross-linker. For example, in certain embodiments, both the cross-linker and the hydrophobic monomer are allyl methacrylate.

In some embodiments, the hydrophilic monomer and/or the hydrophobic monomer are non-cross-linking. There is no overlap between the terms "non-cross-linking hydrophobic monomer", "non-cross-linking hydrophilic monomer" and "cross-linker". In these embodiments, the cross-linker, the hydrophobic monomer and the hydrophilic monomers are different chemical species.

Preferably, the hydrophobic monomer is a different chemical species to the cross-linker. In these embodiments, the use of a hydrophobic monomer that is different to the cross-linker allows the formation of a co-polymer with particularly good mechanical stability, as stated in the Examples.

Preferably, the polymerisation step is carried out by thermal, UV or gamma radiation.

More preferably, the polymerisation step is carried out by UV or gamma radiation.

In a preferred embodiment, the co-monomer mixture further comprises a polymerisation initiator. The polymerisation initiator may be azobisisobutyronitrile (AIBN) or 2-hydroxy-2-methylpriophenone.

The presence of a polymerisation initiator is particularly preferred when the polymerisation is by thermal or UV radiation. In one embodiment, the polymerisation is by thermal means and the initiator is azobisisobutyronitrile (AIBN). In another embodiment, the polymerisation is by UV radiation and the initiator is 2-hydroxy-2-methylpriophenone.

The individual components of the co-monomer mixture should be included in sufficient quantities such that they mix uniformly thereby forming a homogenous solution or dispersion.

The hydrophobic monomer may be present in an amount of 5% to 80% by weight, preferably, 5% to 60% by weight, most preferably 5% to 20% by weight based on the total weight of the co-monomer mixture. The hydrophilic monomer may be present in an amount of 5% to 90% by weight, preferably 5% to 80% by weight, most preferably 50% to 70% by weight based on the total weight of the co-monomer mixture. The cross-linker agent may be present in the co-monomer mixture in an amount of 1% to 25% by weight, preferably 2% to 15% by weight, most preferably 2% to 10% by weight based on the total weight of the co-monomer mixture. The intrinsically electronically active material may be present in an amount of 1% to 20% by weight and most preferably 2% to 10% by weight.

The amount of water in the co-monomer mixture must be sufficient to provide a uniformly mixed homogenous solution or dispersion, and must be sufficient to uniformly disperse the intrinsically electronically active material, which is insoluble in water. The amount of water in the co-monomer mixture may be 1% to 50% by weight, preferably 5% to 50% by weight, most preferably 5% to 20% by weight based on the total weight of the co-monomer mixture.

Preferably, the ratio, by volume, of the at least one hydrophilic monomer to the at least one hydrophobic monomer is from 20:1 to 1:1, more preferably, 20:1 to 5:1, in particular 10:1, in the co-monomer mixture.

Preferably, the ratio, by volume, of the at least one hydrophilic monomer and the at least one hydrophobic monomer:the intrinsically electronically active material is from 30:1 to 2:1, more preferably 6:1 to 3:1, in the co-monomer mixture.

Preferably, the ratio, by volume, of the water to the intrinsically electronically active material is from 1:1 to 10:1, preferably 1:1 to 3:1, in particular 2:1, in the co-monomer mixture.

It has been found that particularly good results are achieved when using the components in the preferable ratios set out above. When used in these ratios, the components are particularly miscible with each other, and this assists the polymerisation process and the formation of a continuous bulk co-polymer material. The ratios referred to are the volume ratios of the various components.

In a preferred embodiment, the co-polymer is hydrated following polymerisation. This hydration step may be carried out using distilled deionized (DD) water, or with an aqueous solution, such as saline, brine, acid, or alkali solution. When saline solution is used for the hydration step, the saline solution preferably has 0.002 g/cc to 0.1 g/cc of NaCl in water, more preferably 0.009 g/cc of NaCl in water. When brine solution is used for the hydration step, the brine solution preferably has 0.3 g/cc of NaCl in water. When acid solution is used for the hydration step, the acid is preferably 5 mol/dm$^3$ $H_2SO_4$. When alkali solution is used for the hydration step, the alkali solution is preferably an aqueous solution of KOH with the KOH is present at 10 wt % to 30 wt %. It is preferred that this hydration step results in the amount of water in the co-polymer being at least 50% by weight, preferably at least 75% by weight based on the total weight of the hydrated co-polymer. Without wishing to be bound by theory, when water is present in this quantity, then it can act as a "plasticizer" and enable the other components of the co-polymer to have sufficient intermolecular mobility such that the conformation of the co-monomer self-organises over time. For example, this self-organisation can occur within a period of about 7-14 days. It has been observed that, following manufacture and/or further hydration, the electrical properties of the co-polymer improve over time. As such, in a preferred embodiment, the co-polymer is stored for at least 7 days, preferably for at least 14 days, following hydration. Not only are the co-polymers stable following hydration, but they also display improved electrical conductivity, as will be shown in the examples, where the properties are demonstrated to improve over a period of over 100 days after hydration.

The co-polymers disclosed herein perform well in a variety of aqueous environments, and hydrate well in a variety of environments, as will be shown in the examples. Furthermore, the anion X$^-$ of formula (I) may be selected depending on the intended hydrating solution and/or the nature of the aqueous environment in which the co-polymers are intended to be used. As such, the co-polymers disclosed herein may be tailored to be particularly well-suited for hydration in a particular solution and/or tailored to be particularly well-suited for use in a particular industrial product. For example, when X$^-$ is methanesulfonate ($CH_3O_3S^-$), the resulting co-polymers hydrate particularly well in aqueous sulphuric acid. The resulting co-polymers also perform particularly well in aqueous sulphuric acid environments in that they display particularly good electrical conductivity. As such, the co-polymers that result when X$^-$ is methanesulfonate ($CH_3O_3S^-$) perform particularly well in a lead acid battery (as lead acid batteries are of an aqueous sulphuric acid environment). By way of another example, when X$^-$ is chloride (Cl$^-$) the resulting co-polymers hydrate particularly well in hydrochloric acid, and display particularly good electrical conductivity in hydrochloric acid environments.

The co-monomer mixture may be provided and polymerised using UV, gamma or thermal radiation. The UV or gamma radiation may be carried out under ambient temperature and pressure, whilst thermal polymerisation may be carried out at temperatures up to 70° C.

In a second aspect the present invention provides a homogenous and isotropic electronically active hydrophilic co-polymer obtainable by the process according to any of the embodiments set out with respect to the first aspect of the invention. It is believed that such a homogeneous co-polymer is novel.

In a third aspect, the present invention provides a co-monomer mixture comprising at least one hydrophobic monomer, at least one hydrophilic monomer, water, at least one cross-linker, and an intrinsically electronically active material.

Preferred hydrophobic monomers, hydrophilic monomers, intrinsically electronically active materials and cross-linkers are defined above.

The polymerisation of the above-mentioned co-monomer mixtures result in the homogenous, isotropic electronically active hydrophilic co-polymers disclosed herein.

Co-polymers and co-monomer mixtures disclosed herein can be used in a variety of applications, and are particularly useful in electronic systems with a water-based environment. However, the co-polymers disclosed herein also provide benefits when used in other electronic systems i.e. those with non-water-based environments, owing to their excellent mechanical properties and electrical conductivity.

Preferably, the co-monomer mixture disclosed herein is used in 3D printing, wherein the co-monomer mixture is polymerised to form a 3D image. It is thought that the hydrophilicity of the co-polymers formed from the co-monomer mixture is advantageous when forming a 3D printed image.

Preferably, the co-polymers disclosed herein are used in a battery together with an aqueous electrolyte. Preferably, the battery is a lead acid battery. Alternatively, the co-polymers disclosed herein are used in an electrochemical cell together with water or an aqueous electrolyte. In this embodiment, the battery or electrochemical cell may be flexible, which is possible due to the advantageous properties of the co-polymers of the present invention. In certain embodiments, the co-polymers disclosed herein are used in a photovoltaic cell.

Preferably, the co-polymers disclosed herein are used as the electrolyte component within a supercapacitor system. As will be appreciated by the skilled person, supercapacitors generally comprise two electrodes and an electrolyte component located therebetween. The maximum capacitance value achieved by a supercapacitor may depend on the nature of the electrolyte as well as the nature of the electrodes. As will also be appreciated by the skilled person, there are multiple different kinds of supercapacitor systems. These include double-layer supercapacitors, pseudo-capacitive supercapacitors, and hybrid supercapacitors. Double-layer supercapacitors typically comprise carbon electrodes that are of comparatively low cost. The capacitance of double-layer supercapacitors is largely electrostatic capacitance. Meanwhile, pseudo-capacitive supercapacitors comprise comparatively higher cost electrodes that are capable of undergoing an oxidation-reduction (redox) reaction together with the electrolyte. Such redox active electrodes can comprise, for example, lanthanum ruthenium or vanadium. The capacitance of pseudo-capacitive supercapacitors is therefore significantly increased (or augmented) by electrochemical capacitance. Hybrid supercapacitors comprise a combination of electrodes with differing characteristics, and can for example comprise one carbon electrode and one electrode capable of undergoing a redox reaction with the electrolyte. The capacitance of hybrid supercapacitors is therefore a combination of electrostatic capacitance and electrochemical capacitance. Conventionally, the electrolyte component within the above supercapacitor systems is a liquid electrolyte.

When the co-polymers disclosed herein are used in place of the conventional liquid electrolyte of a supercapacitor, the resulting supercapacitor achieves particularly high capacitance values. This is demonstrated in the examples. When the co-polymers disclosed herein are used in a double-layer supercapacitor, the capacitance values achieved are three to four orders of magnitude larger relative to the capacitance values that are achieved with a conventional liquid electrolyte. When the co-polymers disclosed herein are used in a pseudo-capacitive supercapacitor, the capacitance values achieved a further increased by a factor of 2 (i.e. relative to the capacitance values of a double layer supercapacitor including the co-polymers of the invention). Without wishing to be bound by theory, it is thought that pseudo-capacitive supercapacitors achieve higher capacitance values due to the ability of the electrolyte and the electrodes to undergo a redox reaction with each other. Without wishing to be bound by theory, it is thought that the electronic properties of the co-polymers disclosed herein are such that an effective redox reaction is achieved, thereby providing particularly increased capacitance values. Good capacitance values are also achieved in the context of hybrid supercapacitors. In summary, for a given supercapacitor system and with a given electrode, the maximum capacitance is increased when using the co-polymers disclosed herein as the electrolyte component within a supercapacitor. Further, the co-polymers remain stable across a commercially acceptable voltage range, as shown in the examples.

Furthermore, as a result of the improved mechanical properties and self-supporting nature of the co-polymers described herein, a supercapacitor including the co-polymers disclosed herein as the electrolyte component does not require an additional separator. Conventionally, when a liquid electrolyte is used within a supercapacitor system, it is necessary for the supercapacitor to further comprise an additional separator in order to maintain separation between the two electrodes. When the co-polymers described herein are used in place of the conventional liquid electrolyte, their mechanical properties and self-supporting nature is such that separation between the electrodes is maintained even in absence of an additional separator.

In another embodiment, the co-polymers disclosed herein are used in a sensing system. Sensing systems may include one or more chemical components, where these chemical components are capable of detecting a particular compound. Advantageously, these one or more chemical components may be dispersed throughout the structure of the co-polymers disclosed herein, and the resulting co-polymer included in the sensing system.

The co-polymers disclosed herein act as a support matrix for the chemical components, wherein the chemical components are stably retained within the co-polymer structure, and their sensing ability preserved. The particular compounds detected by such sensing systems can include glucose. The skilled person will be familiar with the chemical components capable of detecting glucose, and such chemical components can include Benedict's reagent (which comprises anhydrous sodium carbonate, sodium citrate and copper(II) sulfate pentahydrate).

In another embodiment, the co-polymers disclosed herein are used in an optoelectronic display device. In this embodiment, the optoelectronic display device is preferably flexible, which is possible due to the advantageous properties of the co-polymers of the present invention.

In another embodiment, the co-polymers disclosed herein may be used to form an electrically conducting adhesive junction, wherein the adhesive junction is positioned between adjacent electrically conducting components. Preferably, the adjacent electrically conducting components together with the adhesive junction form a stack of integrated circuits, such as a stack of 2D electrical chips.

In another embodiment, there is a method of forming an electrically conducting adhesive junction comprising the steps of:
a. mixing an intrinsically electronically active material and at least one compound of formula (I) with water to form an intermediate mixture;
b. adding at least one hydrophilic monomer, at least one hydrophobic monomer, and at least one cross-linker to the intermediate mixture to form a co-monomer mixture; introducing the co-monomer mixture between adjacent electrically conducting components;
c. polymerising the co-monomer mixture in situ between said electrically conducting components;
wherein formula (I) is defined as:

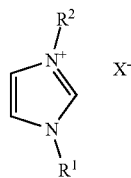

wherein:
$R^1$ and $R^2$ are independently optionally substituted $C_1$-$C_6$ alkyl;
$X^-$ is an anion.

The method of forming an electrically conducting adhesive junction may comprise any of the additional features specified in relation to the process of forming a co-polymer disclosed herein. Further, in another embodiment, there is an electrically conducting adhesive junction formed by this method.

The present invention will now be demonstrated according to the following examples.

Example 1: 3:1 VP to PEDOT-PSS with 1-ethyl-3-methylimidazolium Chloride 1-ethyl-3-methylimidazolium chloride will hereinafter be referred to as "CL-14".

A hydrophilic co-polymer was prepared using vinyl pyrollidone and PEDOT-PSS in a 3:1 ratio, together with CL-14 as a compound of formula (I), and allyl-methacrylate (as crosslinking agent and hydrophobic co-monomer).

To obtain a 3:1 ratio of VP to PEDOT-PSS, 1 g of CL-14 was dissolved in 1 ml PEDOT-PSS (supplied as a dispersion). Then, 1.5 ml of water was added, and the resulting mixture stirred continuously with a stirrer bar for 20 minutes. 3 ml of 1-vinyl-2-pyrolidone was then added dropwise to the PEDOT-PSS/CL-14/water mixture. After a uniformly mixed mixture was achieved, 0.165 ml of allyl methacrylate was added, and 0.11 ml of 2-hydroxy-2-methylpriophenone was added as the initiator.

The resulting co-monomer mixture was cured under UV to produce a cross-linked co-polymer. The water content of the co-polymer "as made" i.e. without further hydration was measured as 45%. The conductivity was measured immediately following manufacture, and then measured again at various numbers of days after manufacture. The results are shown in Table 1 (below) and in FIG. 1.

TABLE 1

| VP:PEDOT-PSS + CL-1 (45% water content) | | | | | |
|---|---|---|---|---|---|
| VP:PEDOTPSS (3:1) + Cl-14 | No. of days after hydration and initial test | Mass (g) | Thickness (mm) | Minimum current (mA) | Maximum current (mA) |
| Water Content 45% | 0 | — | 1.03 | 0.03 | 0.82 |
| | 21 | — | 1.03 | 1.20 | 35.02 |
| | 26 | 0.666 | 1.03 | 1.21 | 34.52 |
| | 30 | 0.664 | 0.99 | 1.23 | 34.59 |
| | 35 | 0.591 | 1.05 | 0.53 | 32.73 |

As can be seen from these results, the co-polymer displays good electrical conductivity immediately after manufacture, and exhibits further improved electrical properties with time following manufacture.

Example 1a and 1b—Hydrated Co-Polymers

Hydrophilic cross-linked co-polymers were made by the same process as that for Example 1. These were then hydrated in a) saline solution (0.009 g/cc NaCl in DD water) and b) brine (0.3 g/cc Na C in water).

1a—Hydration in Saline (0.009 g/Cc NaCl in DD Water)

The co-polymer of example 1 was hydrated until a maximum level of hydration was reached (corresponding to a water content of approximately 80% water by weight). The conductivity was measured immediately after hydration, and then measured again following various numbers of days after hydration. The results are shown in Table 2 (below) and in FIG. 2.

In Table 2, the term "expansion ratio" refers to the thickness of the co-polymer (i.e. the shortest linear dimension of the co-polymer) after a maximum level of hydration has been reached divided by the thickness of the co-polymer before hydration. The thickness was measured by any suitable means such as a micrometer, vernier callipers or a travelling microscope.

TABLE 2

| VP:PEDOT-PSS + CL-14 (maximum hydration in saline) | | | | | | |
|---|---|---|---|---|---|---|
| VP: PEDOTPSS (3:1) + CL-14 | No. of days after hydration | Expansion ratio | Mass (g) | Thickness (mm) | Min current (mA) | Max current (mA) |
| Maximum hydration in saline | 0 | 1.35 | 0.702 | 1.29 | 0.62 | 33.98 |
| | 4 | | 0.712 | | 1.03 | 36.78 |
| | 6 | | 0.722 | | 0.97 | 76.75 |
| | 12 | | 0.702 | | 5.61 | 117.09 |

1b—Hydration in Brine

The co-polymer of example 1 was hydrated in brine until a maximum level of hydration was reached (corresponding to a water content of approximately 75% by weight). The conductivity was measured immediately after hydration, and then measured again following various numbers of days after hydration. The results are shown in Table 3 (below) and in FIG. 3.

The expansion ratio in Table 3 was calculated in the same manner as for Table 2.

TABLE 3

VP:PEDOT-PSS + CL-14 (maximum hydration in brine)

| VP:PEDOTPSS (3:1) + CL-14 | No. of days after hydration | Expansion ratio | Mass (g) | Thickness (mm) | Min current (mA) | Max current (mA) |
|---|---|---|---|---|---|---|
| Maximum hydration in brine | 0 | 1.27 | 0.850 | 1.36 | — | 63.95 |
| | 6 | | 0.853 | 1.65 | — | 113.86 |
| | 14 | | 0.853 | 1.51 | — | 149.73 |
| | 22 | | 0.829 | 1.30 | 4.26 | 171.68 |
| | 29 | | — | 1.64 | 4.69 | 344.86 |

As can be seen, the co-polymers display good electrical conductivity immediately after hydration in each aqueous solution, and exhibit further improved electrical properties with time following hydration.

Example 2: 3:1 VP to PEDOT-PSS with 1-ethy-3-methylimidazolium Methanesulfonate 1-ethy-3-methylimidazolium methanesulfonate will hereinafter be referred to as ST-35.

A hydrophilic cross-linked co-polymer was obtained using the same method as that set out for Example 1, except that ST-35 was used in place of CL-14.

The water content of the co-polymer "as made" i.e. without further hydration was measured as 45%. The conductivity was measured immediately following manufacture, and then measured again at 9 days after manufacture. The results are shown in Table 4 (below) and in FIG. 4.

TABLE 4

VP:PEDOT-PSS + ST-35 (45% water content)

| VP:PEDOTPSS (3:1) + ST-35 | No. of days after manufacture | Thickness (mm) | Min current (mA) | Max current (mA) |
|---|---|---|---|---|
| 45% water content | 0 | 1.31 | 0.01 | 1.82 |
| | 9 | 1.24 | 0.08 | 3.31 |

As can be seen from these results, the co-polymer displays good electrical conductivity immediately after manufacture, and exhibits further improved electrical properties with time following manufacture.

Example 2a and 2b—Hydrated Co-Polymers

Cross-linked co-polymers were made by the same process as that for Example 2. These were then hydrated in a) DD water and b) sulphuric acid solution (concentration 5 mol/dm$^3$).

2a—Hydration in DD Water

The co-polymer of example 2 was hydrated until a maximum level of hydration was reached at 25° C. (corresponding to a water content of approximately 78% by weight). The conductivity was measured immediately after hydration, and then measured again following 7 days after hydration. The results are shown in Table 5 (below) and in FIG. 5.

The expansion ratio in Table 5 was calculated in the same manner as for Table 2.

TABLE 5

VP:PEDOT-PSS + ST-35 (maximum hydration in DD water)

| VP: PEDOTPSS (3:1) + ST-35 | No. of days after manufacture and initial test | Expansion ratio | Thickness (mm) | Min current (mA) | Max current (mA) |
|---|---|---|---|---|---|---|
| Maximum hydration in DD water | 0 | 1.30 | 1.74 | 1.23 | 18.45 |
| | 7 | | 1.74 | 1.87 | 24.64 |

2a—Hydration in Sulphuric Acid Solution

The co-polymer of example 2 was hydrated until a maximum level of hydration was reached (corresponding to a water content of approximately 84% by weight). The conductivity was measured immediately after hydration, and then measured again following 7 days after hydration. The results are shown in Table 6 (below) and in FIG. 6.

The expansion ratio in Table 6 was calculated in the same manner as for Table 2.

TABLE 6

VP:PEDOT-PSS + ST-35 (maximum hydration in H$_2$SO$_4$)

| VP: PEDOTPSS (3:1) + ST-35 | No. of days after manufacture and initial test | Expansion ratio | Thickness (mm) | Min current (mA) | Max current (mA) |
|---|---|---|---|---|---|
| Maximum hydration in H$_2$SO$_4$ | 0 | 1.44 | 1.79 | 5.78 | 37.04 |
| | 7 | | 1.88 | 7.19 | 128.30 |

As can be seen, the co-polymers display good electrical conductivity immediately after hydration in each aqueous solution, and exhibit further improved electrical properties with time following hydration.

Example 3

Three co-polymers were prepared using three different ratios of vinyl pyrollidone to PEDOT-PSS, and their electrical conductivities compared.

A first hydrophilic co-polymer was prepared using vinyl pyrollidone and PEDOT-PSS in a 4:1 ratio, together with CL-14 as a compound of formula (I), and allyl-methacrylate (as crosslinking agent and hydrophobic co-monomer).

A 4:1 ratio of VP to PEDOT-PSS was obtained by dissolving 1 g of 1-ethyl-3-methylimidazolium chloride in 1 ml PEDOT-PSS. 1.5 ml of water was then added whilst stirring using a stirrer bar. 4 ml of 1-vinyl-2-pyrrolidone was then added dropwise to the PEDOT-PSS/CL-14/water mixture. Once a uniform mixture was achieved, 0.195 ml of allyl methacrylate and 0.13 ml of 2-hydroxy-2-methylpriophenone (as the initiator) was added.

The resulting co-monomer mixture was be cured under UV to produce a cross-linked co-polymer.

A second hydrophilic co-polymer was prepared using vinyl pyrollidone and PEDOT-PSS in a 3:1 ratio, together with CL-14 as a compound of formula (I), and allyl-methacrylate (as crosslinking agent and hydrophobic co-monomer). This co-polymer was prepared using the same method as that for the first co-polymer of this example, except that 3 ml of 1-vinyl-2-pyrrolidone was used instead of 4 ml.

A third hydrophilic co-polymer was prepared using vinyl pyrollidone and PEDOT-PSS in a 2:1 ratio, together with CL-14 as a compound of formula (I), and allyl-methacrylate (as crosslinking agent and hydrophobic co-monomer). This co-polymer was prepared using the same method as that for the first co-polymer of this example, except that 2 ml of 1-vinyl-2-pyrrolidone was used instead of 4 ml. The conductivity of each of the above three co-polymers was measured immediately following manufacture, and then measured again at various numbers of days after manufacture. The results are shown in Table 7 (below) and at FIGS. 7, 8, and 9.

TABLE 7

VP:PEDOTPSS + CL-14 with varying ratios of VP:PEDOTPSS

| VP:PEDOTPSS + Cl-14 + water | No. of days after manufacture | Mass (g) | Thickness (mm) | Minimum current (mA) | Maximum current (mA) |
|---|---|---|---|---|---|
| 4:1 | 0 | — | 1.06 | 0.02 | 0.62 |
|  | 21 | — | 1.06 | 0.90 | 30.88 |
|  | 30 | 0.630 | 1.02 | 1.07 | 31.47 |
|  | 35 | 0.528 | 1.01 | 0.89 | 29.36 |
|  | 107 | 0.537 | 1.01 | 0.87 | 32.07 |
| 3:1 | 0 | — | 1.03 | 0.03 | 0.82 |
|  | 21 | — | 1.03 | 1.20 | 35.02 |
|  | 26 | 0.666 | 1.03 | 1.21 | 34.52 |
|  | 30 | 0.664 | 0.99 | 1.23 | 34.59 |
|  | 35 | 0.591 | 1.05 | 0.53 | 32.73 |
| 2:1 | 0 | 0.709 | 0.77 | 0.16 | 13.28 |
|  | 6 | 0.710 | 0.77 | 0.21 | 12.98 |
|  | 12 | 0.759 | 0.81 | 0.66 | 18.71 |
|  | 63 | 0.781 | 0.85 | 0.55 | 29.09 |

As can be seen, all of these co-polymers display good electrical conductivity with improvements over time following manufacture.

Examples 4 to 9

The terminology in the table below applies across examples 4 to 9:

| Acronym | Component |
|---|---|
| VP | 1-vinyl-2-pyrrolidone |
| PEDOTPSS | poly(3,4-ethylenedioxythiophene)-poly(styrenesulfonate) as a 1.3 wt % dispersion in $H_2O$ (PEDOT 0.5 wt %, PSS 0.8 wt %) |
| CL4 | 1-ethyl-3-methylimidazolium chloride |
| ST35 | 1-ethy1-3-methylimidazolium methansulfonate |
| 413 | 1-ethyl-3-methylimidazolium dicyanamide |

Across Examples 4-9, various co-polymers were prepared. The composition of the co-polymers across Examples 4-9 are listed in the table below, and were prepared using a similar methodology to that of examples 1-3: The abbreviated term listed in the "co-polymer" column of the table below will be used throughout examples 4-9:

| Co-polymer | Composition |
|---|---|
| VP:PEDOTPSS:CL4 | 3 ml VP, 1 ml PEDOTPSS, 1 g CL14, 1.5 ml H2O |
| VP:PEDOTPSS:ST35 | 3 ml VP, 1 ml PEDOTPSS, 1 g ST35, 1.5 ml H2O |
| VP:PEDOTPSS:413 | 3 ml VP, 1 ml PEDOTPSS, 1 ml 413, 1.5 ml H2O |

Where applicable, the following hydration solutions were used. The abbreviated term listed in the "solution" column of the table below will be used throughout examples 4-9:

| Solution | Composition |
|---|---|
| $H_2O$ | Double distilled water |
| Saline | 0.9 g NaCl in 100 ml double distilled water |
| Brine | 6.0 g NaCl in 100 ml double distilled water |
| $H_2SO_4$ | 5 mol/dm$^3$ $H_2SO_4$ |

The electrical properties of the co-polymers of examples 4-9 were tested under potentiostatic conditions within either a cylindrical electrode device, or a flat electrode device.

The cylindrical electrode device comprises working and counter electrodes are glassy carbon rods with a cross-section of 0.06 cm$^2$. The electrode surfaces are macroscopically smooth, thus their cross-sections can be taken as the effective electroactive area. The quasi-reference electrode consists of a Ag wire inserted in the active polymer film.

The flat electrode device was used in order to assess the suitability of these materials for large geometric areas (above 5 cm$^2$).

All measurements were recorded with an Ivium—Compactstat under ambient conditions and humidity. Irreversible changes in the co-polymer structure (e.g. over-oxidation) were monitored by systematic analysis of the open-circuit potential between the working and reference electrodes.

Example 4

A VP:PEDOTPSS:CI4 co-polymer was prepared using a similar methodology to that of examples 1-3. The electrical properties of the co-polymer were tested. The results are shown in FIGS. 10 and 11. FIGS. 10 and 11 are cyclic voltammograms at 100 mV s$^{-1}$, as a function of either the negative (FIG. 10) or positive (FIG. 11) potential limits. The dashed lines indicate non-symmetrical current responses linked to irreversible structural changes (e.g. decomposition) in the co-polymer layer.

These results show that the co-polymer is stable across a potential window of approximately 2V, across which its structure and composition is not compromised. This behaviour is consistent with the electrochemical responses observed in PEDOT:PSS modified electrodes in electrochemical cells.

Example 5

A VP:PEDOTPSS:CI4 co-polymer was prepared using a similar methodology to that of examples 1-3. The electrical properties of the co-polymer were tested. The results are shown in FIG. 12, which is a cyclic voltammogram at scan rates of 50, 100, 150, and 200 mV s$^{-1}$.

A further three VP:PEDOTPSS:CI4 co-polymers were prepared using a similar methodology to that of examples 1-3. The first co-polymer was then hydrated in $H_2O$, the second co-polymer was hydrated in saline, and the third co-polymer was hydrated in $H_2SO_4$. The electrical properties of each of these three co-polymers were tested, and the results are shown in FIG. 13 (hydration in $H_2O$), FIG. 14 (hydration in saline), and FIG. 15 (hydration in $H_2SO_4$). FIGS. 13-15 are cyclic voltammograms at scan rates of 50, 100, 150, and 200 mV s$^{-1}$.

The non-hydrated VP:PEDOTPSS:CI4 co-polymer, and each of the three hydrated VP:PEDOTPSS:CI4 co-polymers were also tested at a scan rate of 5 mV s$^{-1}$, and the results are compared on the same voltammogram of FIG. 16.

The results of FIGS. 12-16 indicate that the electrical properties of each co-polymer are characteristic of pseudo-capacitive supercapacitive systems.

Example 6

A VP:PEDOTPSS:CI4 co-polymer was prepared using a similar methodology to that of examples 1-3. The electrical properties of the co-polymer were tested using two different flat electrode devices—these flat electrode devices differ from one another in the surface area of their electrodes. The results are shown in FIG. 17 (electrode surface area of 0.5 cm$^2$) and FIG. 18 (electrode surface area of 0.6 cm$^2$). FIGS. 17 and 18 are cyclic voltammograms at scan rates of 25, 50, 100, 150 and 200 mV s$^{-1}$.

The results of FIGS. 17 and 18 indicate that the electrical properties of each co-polymer are characteristic of pseudo-capacitive supercapacitive systems. This is particularly with regards to the fact that the capacitive responses scale with the electrode area of the flat electrode device.

Example 7

Four VP:PEDOTPSS:CI4 co-polymers were prepared using a similar methodology to that of examples 1-3. The first co-polymer was then hydrated in $H_2O$, the second co-polymer was hydrated in saline, and the third co-polymer was hydrated in brine, and the fourth co-polymer was hydrated $H_2SO_4$. The electrical properties of each of these four co-polymers were tested, and the results are shown in FIG. 19.

Four VP:PEDOTPSS:ST35 co-polymers were prepared using a similar methodology to that of examples 1-3. The first co-polymer was then hydrated in $H_2O$, the second co-polymer was hydrated in saline, and the third co-polymer was hydrated in brine, and the fourth co-polymer was hydrated $H_2SO_4$. The electrical properties of each of these four co-polymers were tested, and the results are shown in FIG. 20.

Four VP:PEDOTPSS:413 co-polymers were prepared using a similar methodology to that of examples 1-3. The first co-polymer was then hydrated in $H_2O$, the second co-polymer was hydrated in saline, and the third co-polymer was hydrated in brine, and the fourth co-polymer was hydrated $H_2SO_4$. The electrical properties of each of these four co-polymers were tested, and the results are shown in FIG. 21.

FIGS. 19-21 are cyclic voltammograms at scan rates of 100 mV s$^{-1}$. The results of FIGS. 19-21 show that the current recorded for co-polymers hydrated in $H_2O$ is smaller than the current recorded for co-polymers hydrated in saline.

Example 8

Two VP:PEDOTPSS:CI4 co-polymers were prepared using a similar methodology to that of examples 1-3. The first co-polymer was then hydrated in $H_2O$, and the second co-polymer was hydrated in saline. The electrical properties of each of these two co-polymers were tested. The results are shown in FIG. 22 (hydration in $H_2O$) and FIG. 23 (hydration in saline). FIGS. 22 and 23 are cyclic voltammograms at scan rates of 50, 100, 150 and 200 mV s$^{-1}$.

These results indicate that after hydration, there is ion impregnation throughout the co-polymer matrix, which enables the formation of a more compact electrochemical double layer at the electrode surface. These results therefore support the possibility of incorporating chemical components in the polymer matrix for use in sensing applications.

Example 9

A VP:PEDOTPSS:ST35 co-polymer was prepared using a similar methodology to that of examples 1-3. The co-polymer was then hydrated in saline. The electrical properties were tested. The results are shown in FIGS. 24 and 25. FIG. 24 is a chronoamperometric transient from 1V to various negative potentials. FIG. 25 plots the charges obtained by integration of the transients as a function of amplitude of the potential step. The results of these figures are indicative of electrolytic capacitance. In particular, the saline hydrated VP:PEDOTPSS:ST35 co-polymer displays capacitance in the order of 0.010 F cm$^{-2}$. This capacitance value is over three orders of magnitude larger than the geometric capacitance at carbon electrodes in aqueous electrolyte.

Example 10

A VP:PEDOTPSS:ST35 co-polymer was prepared using a similar methodology to that of examples 1-3. The co-polymer was then hydrated in saline. The electrical properties were tested. The results are shown in FIG. 26.

FIG. 26 shows the frequency dependence of the phenomenological specific capacitance of the co-polymer. Capacitance values were obtained by examining the electrochemical impedance spectroscopy at the open circuit potential. The specific capacitance approaches values close to 0.012 Fg$^{-1}$.

What is claimed is:
1. An electrochemical cell, comprising:
a homogenous, isotropic electronically active hydrophilic co-polymer, wherein the co-polymer is formed by a process comprising the steps of:

a. mixing an intrinsically electronically active material and at least one compound of formula (I) with water to form an intermediate mixture;
b. adding at least one hydrophilic monomer, at least one hydrophobic monomer, and at least one cross-linker to the intermediate mixture to form a co-monomer mixture; and
c. polymerising the co-monomer mixture to form the homogenous, isotropic electronically active hydrophilic co-polymer;

wherein formula (I) is defined as:

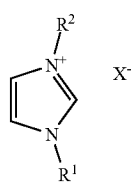

wherein:
$R^1$ and $R^2$ are independently optionally substituted $C_1$-$C_6$ alkyl;
$X^-$ is an anion.

2. The electrochemical cell according to claim 1, further comprising an aqueous electrolyte, wherein the electrochemical cell is a battery.

3. The electrochemical cell according to claim 1, further comprising two electrodes with the co-polymer located therebetween, wherein the electrochemical cell is a supercapacitor.

4. The electrochemical cell according to claim 1, wherein $X^-$ is selected from $Cl^-$, $C_2N_3^-$, $CH_3O_3S^-$, $BF_4^-$, $PF_6^-$, $CF_3SO_3^-$, $Al_2Cl^-$, $AlCl_4^-NO_3^-$, $OH^-$, $F^-$, $Br^-$, $I^-$, $S_2^-$, $N_3^-$, $O_2^-$, $CO_3^{2-}$, $ClO_3^{2-}$, $CrO_4^{2-}$, $CN^-$, $Cr_2O_7^{2-}$, $SCN^-$, $SO_3^{2-}$, $MnO_4^-$, $CH_3COO^-$, $HCO_3^-$, $ClO_4^-$ and $C_2O_4^{2-}$.

5. The electrochemical cell according to claim 1, wherein the optional substituent is selected from one or more of hydroxyl, halo, $NH_2$, $NO_2$., $CH_3O$, $CO_2H$, COOOH, NR, NRR', NHCOR and RSH, wherein R and R' are $C_1$-$C_6$ alkyl.

6. The electrochemical cell according to claim 1, wherein one of $R^1$ and $R^2$ is optionally substituted methyl, and the other is optionally substituted ethyl.

7. The electrochemical cell according to claim 1, wherein, in step b, the at least one hydrophilic monomer and the at least one hydrophobic monomer are added to the intermediate mixture prior to the addition of the cross-linker.

8. The electrochemical cell according to claim 1, wherein, in step b, the at least one hydrophilic monomer is added to the intermediate mixture prior to the addition of the at least one hydrophobic monomer.

9. The electrochemical cell according to claim 1, wherein the intrinsically electronically active material is polyethylenedioxythiophene:polystyrene sulphonate, polypyrrole, polyaniline, polyacetylene, or a combination thereof.

10. The electrochemical cell according to claim 1, wherein the at least one hydrophilic monomer is methacrylic acid, 2-hydroxyethyl methacrylate, ethyl acrylate, vinyl pyrrolidone, propenoic acid methyl ester, monomethacryloyloxyethyl phthalate, ammonium sulphatoethyl methacrylate, poly vinyl alcohol, or a combination thereof.

11. The electrochemical cell according to claim 1, wherein the at least one hydrophobic monomer is methyl methacrylate, allyl methacrylate, acrylonitrile, methacryloxypropyltris(trimethylsiloxy)silane, 2,2,2-trifluoroethyl methacrylate, or a combination thereof.

12. The electrochemical cell according to claim 1, wherein the at least one cross-linker is allyl methacrylate or ethylene glycol dimethacrylate.

13. The electrochemical cell according to claim 1, wherein both the at least one cross-linker and the at least one hydrophobic monomer is allyl methacrylate.

14. The electrochemical cell according to claim 1, wherein the polymerisation step is carried out by thermal, UV, or gamma radiation.

15. The electrochemical cell according to claim 1, wherein the co-monomer mixture further comprises a polymerisation initiator.

16. The electrochemical cell according to claim 15, wherein the polymerisation initiator is azobisisobutyronitrile or 2-hydroxy-2-methylpriophenone.

17. The electrochemical cell according to claim 1, wherein the ratio of the at least one hydrophilic monomer to the at least one hydrophobic monomer is from 20:1 to 1:1 in the co-monomer mixture.

18. The electrochemical cell according to claim 1, wherein the ratio of the at least one hydrophilic monomer to the at least one hydrophobic monomer is from 20:1 to 5:1 in the co-monomer mixture.

19. The electrochemical cell according to claim 1, wherein the ratio of the at least one hydrophilic monomer and the at least one hydrophobic monomer:the intrinsically electronically active material, is from 30:1 to 2:1 in the co-monomer mixture.

20. The electrochemical cell according to claim 1, wherein the ratio of the water to the intrinsically electronically active material is from 1:1 to 10:1 in the intermediate mixture.

21. The electrochemical cell according to claim 1, wherein the ratio of the water to the intrinsically electronically active material is from 1:1 to 3:1 in the intermediate mixture.

22. The electrochemical cell according to claim 1, wherein the process further comprises the step of hydrating the co-polymer after the step of polymerising the co-monomer mixture.

23. The electrochemical cell according to claim 22, wherein the co-polymer is hydrated such that the resulting hydrated co-polymer comprises at least 10 wt % water, based on the total weight of the hydrated co-polymer.

* * * * *